US012690714B2

(12) United States Patent
Molinaro et al.

(10) Patent No.: US 12,690,714 B2
(45) Date of Patent: Jul. 28, 2026

(54) BREWING UNIT

(71) Applicant: LUIGI LAVAZZA S.P.A., Turin (IT)

(72) Inventors: Gabriele Molinaro, Turin (IT);
Gabriele Luciano Picone, Turin (IT);
Denis Rotta, Turin (IT)

(73) Assignee: LUIGI LAVAZZA S.P.A., Turin (IT)

( * ) Notice: Subject to any disclaimer, the term of this
patent is extended or adjusted under 35
U.S.C. 154(b) by 733 days.

(21) Appl. No.: 17/997,987

(22) PCT Filed: Jun. 16, 2021

(86) PCT No.: PCT/IB2021/055321
§ 371 (c)(1),
(2) Date: Nov. 4, 2022

(87) PCT Pub. No.: WO2021/255669
PCT Pub. Date: Dec. 23, 2021

(65) Prior Publication Data
US 2023/0165400 A1 Jun. 1, 2023

(30) Foreign Application Priority Data
Jun. 17, 2020 (IT) ........................ 102020000014434

(51) Int. Cl.
*A47J 31/44* (2006.01)
*A47J 31/46* (2006.01)
*A47J 31/52* (2006.01)
(52) U.S. Cl.
CPC ....... *A47J 31/4467* (2013.01); *A47J 31/4492*
(2013.01); *A47J 31/461* (2018.08); *A47J*
*31/52* (2013.01)

(58) Field of Classification Search
CPC .. A47J 31/4492; A47J 31/4467; A47J 31/461;
A47J 31/52
See application file for complete search history.

(56) References Cited

U.S. PATENT DOCUMENTS

2008/0121111 A1 5/2008 Paget et al.
2011/0048242 A1 3/2011 Stefanoni
(Continued)

OTHER PUBLICATIONS

International Search Report for PCT/IB2021/055321 dated Sep. 24,
2021.
Written Opinion for PCT/IB2021/055321 dated Sep. 24, 2021.

*Primary Examiner* — Edward F Landrum
*Assistant Examiner* — Kuangyue Chen
(74) *Attorney, Agent, or Firm* — Sughrue Mion, PLLC

(57) ABSTRACT

A brewing unit for preparing beverages from a powdered
product containing at least one ingredient is provided. The
brewing unit has a support structure having an inner cavity,
and a dispensing assembly having a first assembly part
configured as a drawer and having a receptacle adapted to
receive the powdered product, and a second assembly part
mounted to slide vertically within an upper part of the inner
cavity, between a raised position and a lowered position. A
filtering element defining a bottom surface of the receptacle
and of the brewing chamber is mounted within the first
assembly part. A dispensing duct is formed through the
filtering element. A brewing head defining a top surface of
the brewing chamber is carried by a lower end of the second
assembly part.

11 Claims, 23 Drawing Sheets

(56)            References Cited

U.S. PATENT DOCUMENTS

| | | | |
|---|---|---|---|
| 2016/0157668 A1* | 6/2016 | Bugnano | A47J 31/4492 |
| | | | 426/232 |
| 2019/0117010 A1 | 4/2019 | Rotta et al. | |
| 2020/0154933 A1* | 5/2020 | Kuang | A47J 31/3642 |

* cited by examiner

BREWING UNIT

CROSS-REFERENCE TO RELATED APPLICATIONS

This application is a National Phase application of PCT International Application No. PCT/IB2021/055321, having an International Filing Date of Jun. 16, 2021, claiming priority to Italian Patent Application No. 102020000014434, filed Jun. 17, 2020 each of which is hereby incorporated by reference in its entirety.

FIELD OF THE INVENTION

The present invention relates to a brewing unit for a machine for preparing beverages through the use of a powdered product containing one or more ingredients, in particular coffee.

In the following description, reference will be made for simplicity to the use of a compacted tablet, but it is obvious that the invention is not limited to a brewing unit capable of operating with tablets but rather is applicable more generally also to brewing units using capsules or, alternatively, pods, or even a bulk powdered product.

SUMMARY OF THE INVENTION

The object of the present invention is to provide an improved brewing unit.

This and other objects are fully achieved according to the present invention by a brewing unit and a method for preparing a beverage as described and claimed herein.

Advantageous embodiments of the brewing unit according to the invention are specified in the dependent claims, the content of which is to be understood as an integral part of the description that follows.

In short, the invention relates to a brewing unit for the preparation of beverages from a powdered product containing at least one ingredient, comprising a support structure with an internal cavity, and a dispensing assembly which includes a first assembly part configured as a drawer insertable into or extractable from a lower part of said cavity and having a receptacle adapted to receive said powdered product, and a second assembly part, vertically mounted to slide within an upper portion of said cavity, between a raised position, wherein the second assembly part allows the insertion or extraction of the first assembly part, and a lowered position, wherein the second assembly part and the first assembly part are coupled to each other to jointly define an brewing chamber, wherein within said first assembly part a filtering element is mounted to translate vertically through which a dispensing duct is obtained, said filtering element defining a bottom surface of the receptacle and of the brewing chamber, and wherein a brewing head, suitable for injecting water into the brewing chamber, is carried by a lower end of the second assembly part, said brewing head defining a top surface of the brewing chamber and being provided with radial sealing means configured to come in contact with a radially inner surface of the receptacle in the lowered position of the second assembly part.

In the aforesaid unit, the brewing head and filtering element act as protective elements, preventing any residue which may accumulate in the brewing chamber, particularly when using compacted tablets or a bulk powdered product, from entering the hydraulic lines of the first and second assembly parts, respectively.

BRIEF DESCRIPTION OF THE FIGURES

Further features and advantages of this invention will be clarified by the detailed description that follows, given purely by way of non-limiting example in reference to the appended drawings, wherein.

DETAILED DESCRIPTION

Figure 1:
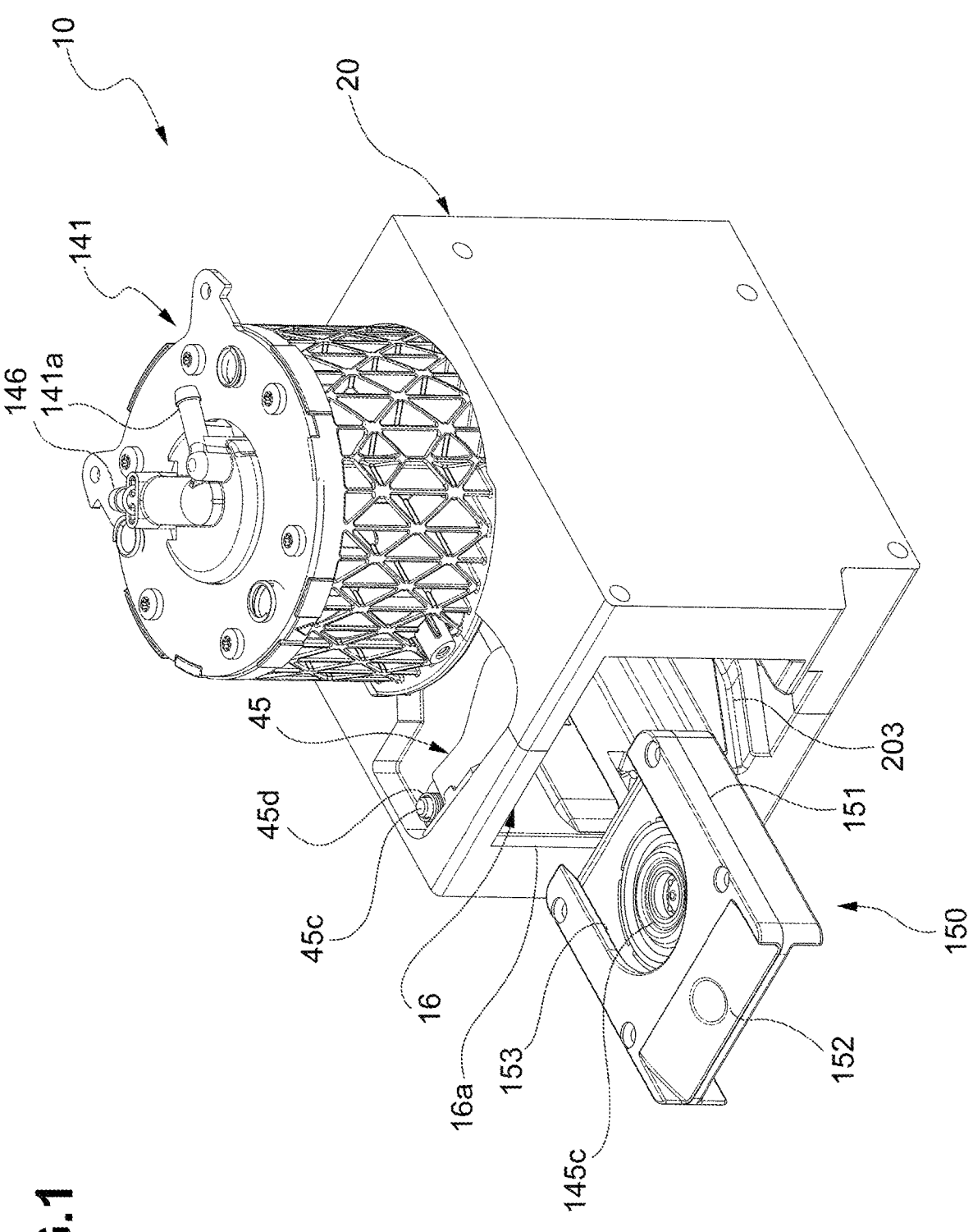
FIGS. 1 to 4 are perspective views of a brewing unit according to the invention, in different stages of operation.

Referring to FIG. 1, a brewing unit for a machine for preparing beverages, in particular coffee, from a compacted tablet containing one or more ingredients, in particular coffee powder, is collectively denoted as 10.

As explained above, although the invention is described in reference to the use of a compacted tablet containing the ingredient, or ingredients, for the preparation of the beverage, it is not to be understood as limited to a brewing unit adapted for operation with a tablet, but rather as including also the case where in place of a tablet there is provided a dose of powder contained in a capsule, pod, or other similar package suitable for the preparation of beverages by brewing. The invention also includes the case wherein a bulk powdered product is used. For the purposes of the present invention, the term "powdered product" therefore covers both the bulk powdered product and the powdered product packaged in capsule or pod form or compacted into tablet form.

With reference to FIGS. 5 to 15, the brewing unit 10 basically comprises a dispensing assembly including a first assembly part 12 made as a drawer and a second movable assembly part 14 and a support structure 20 that supports the first assembly part 12 and the second assembly part 14 and defines an internal cavity 16. An insertion opening 16a, formed on a front wall of the support structure 20, provides access to the cavity 16.

Figure 2:
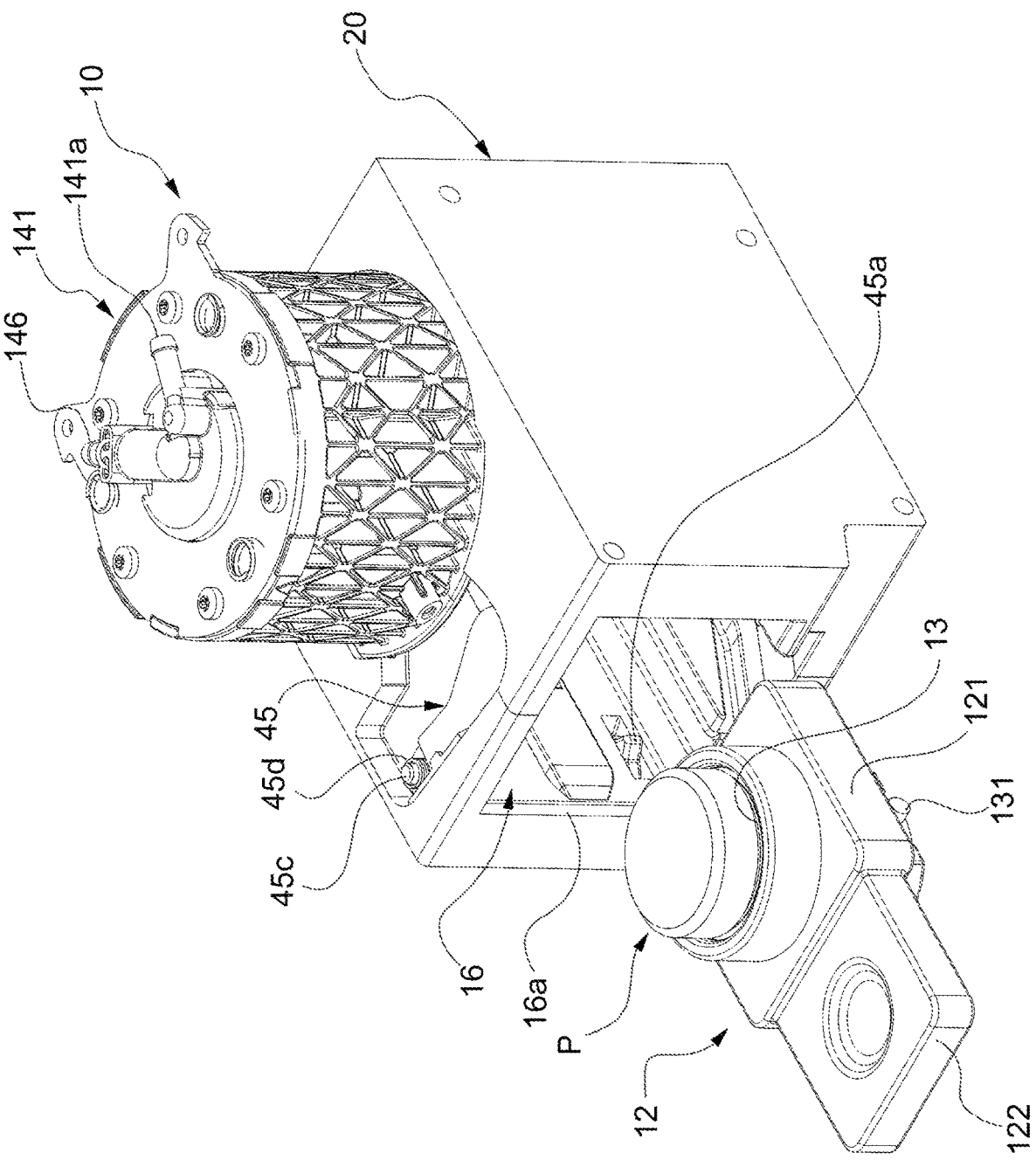
Figure 3:
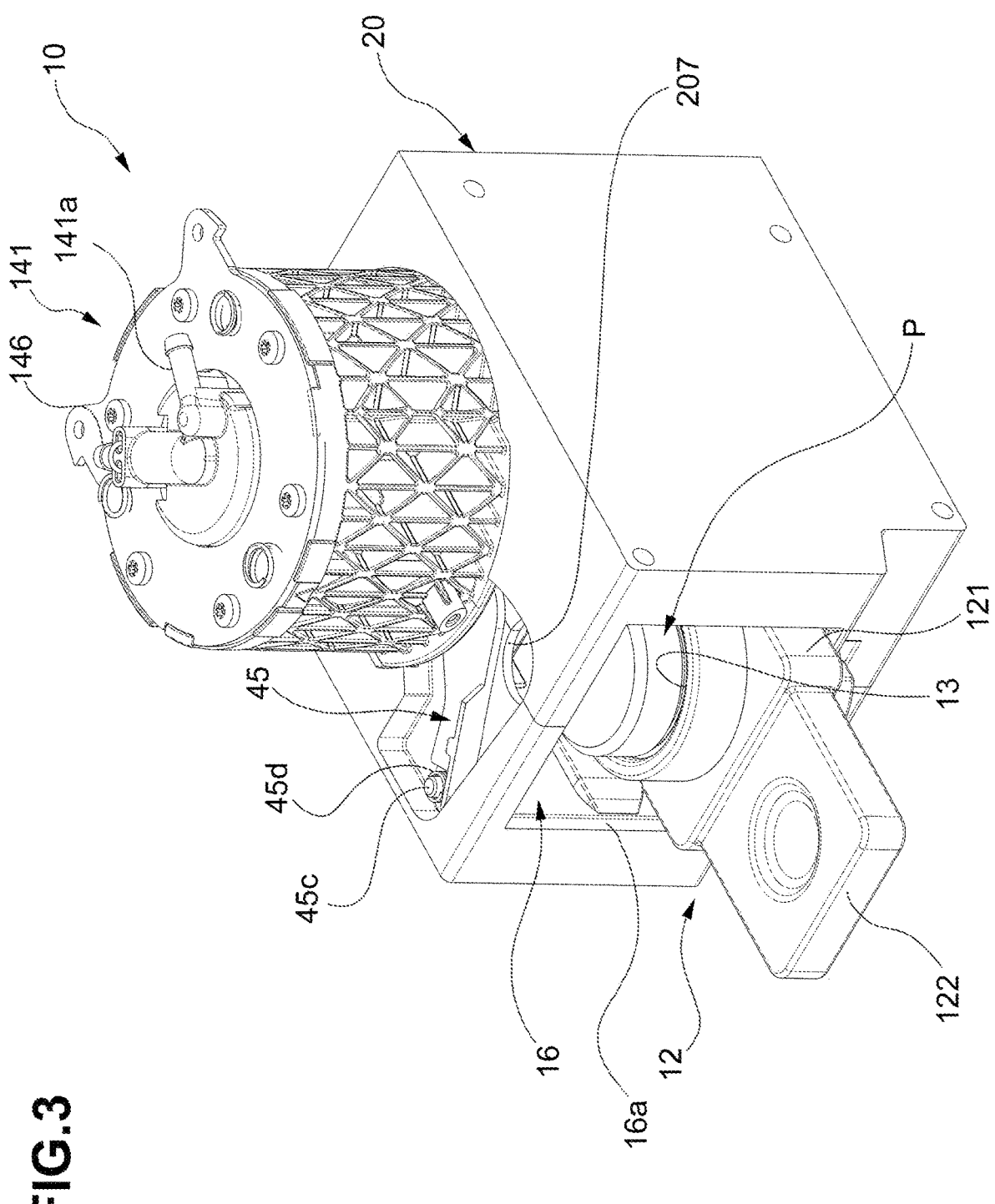
Figure 4:
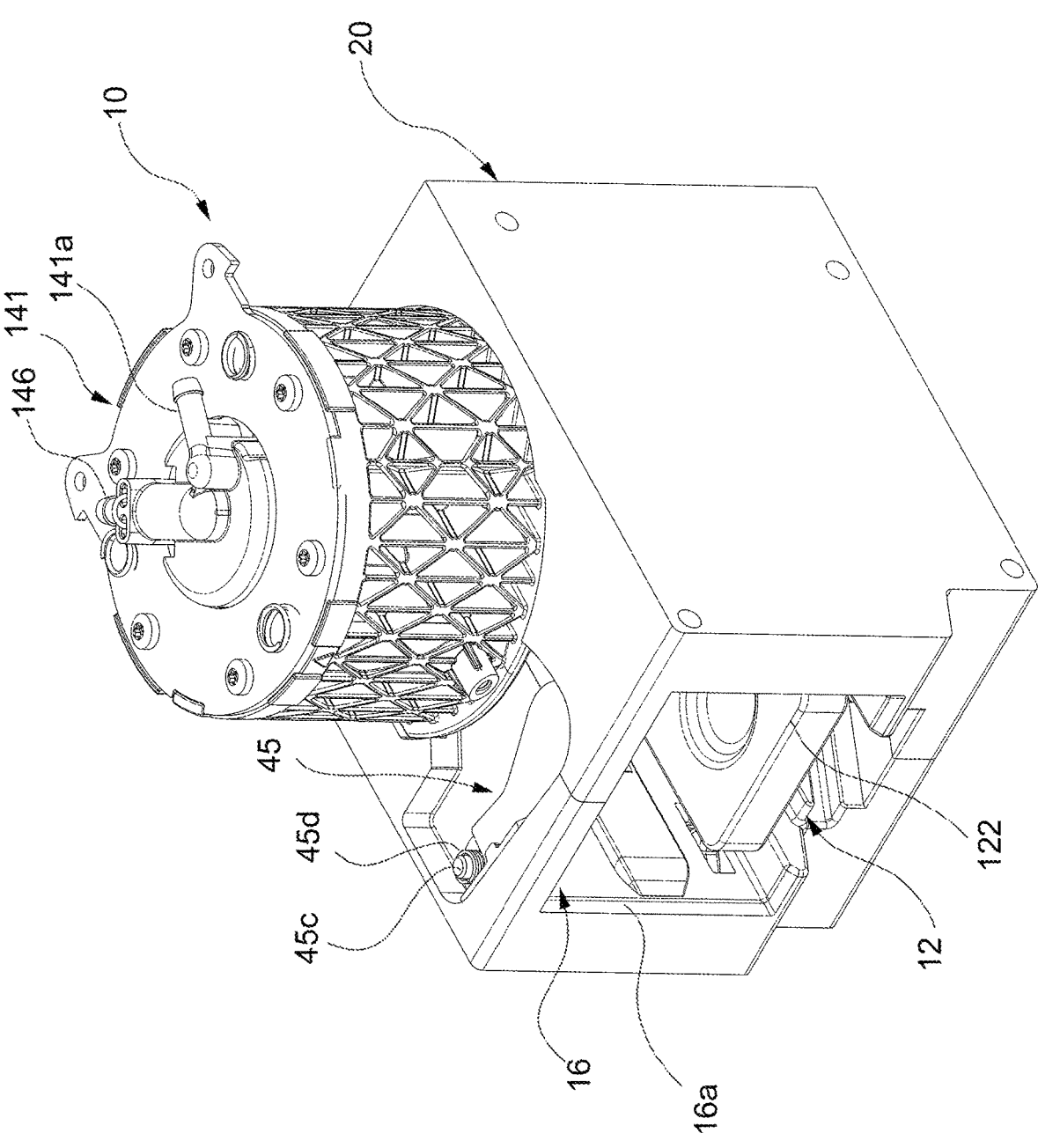
Figure 6:
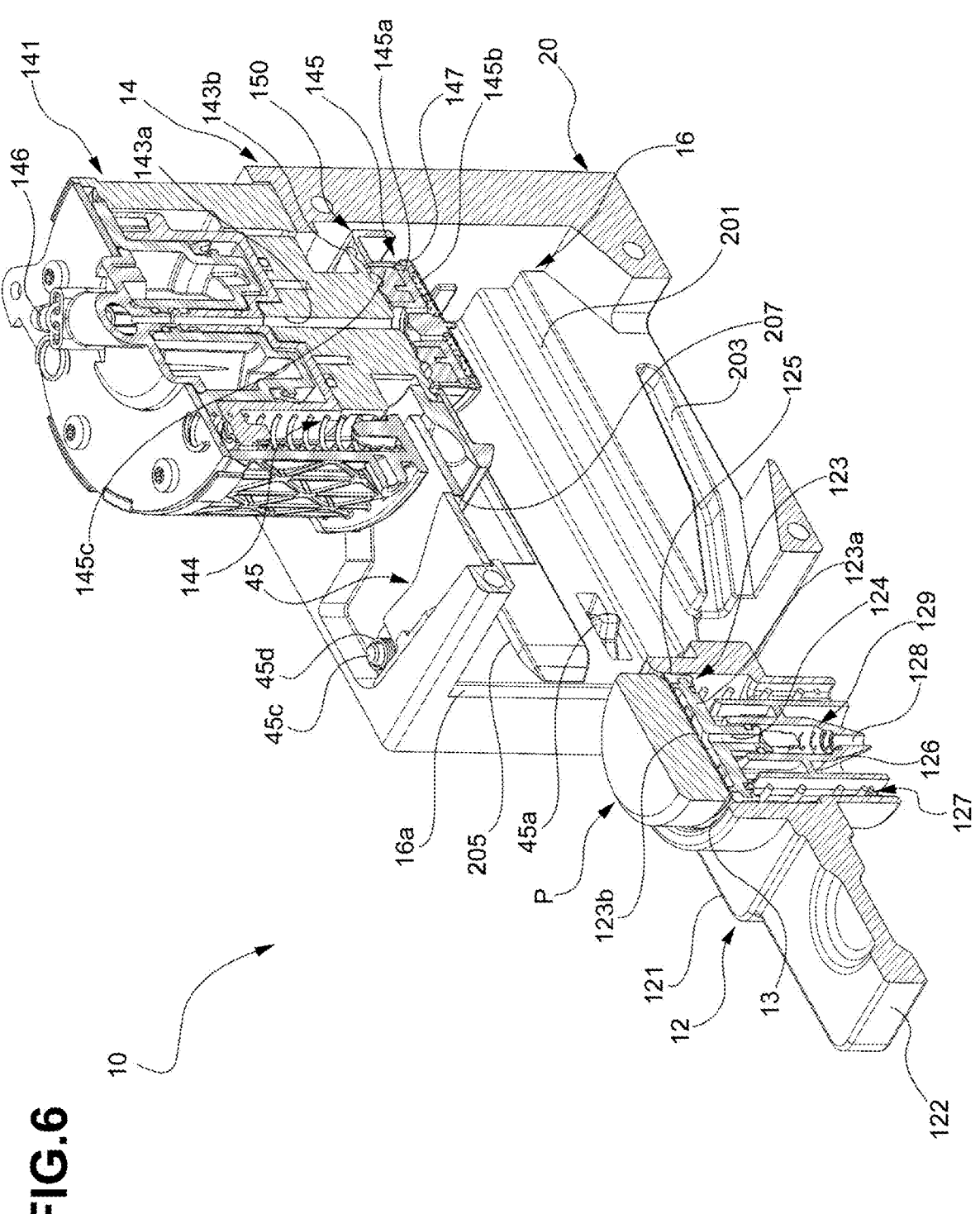
Figure 7:
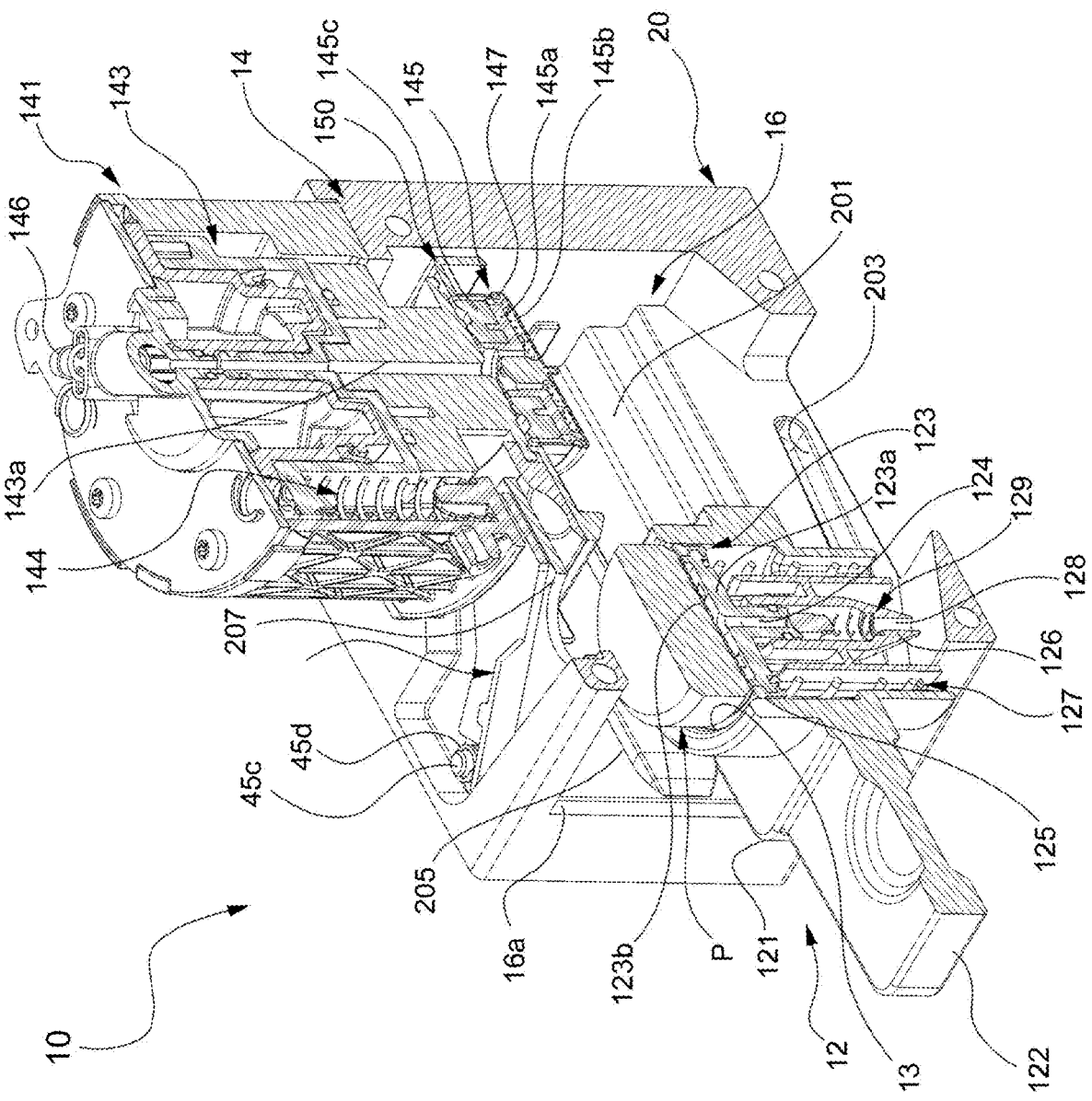
Figure 8:
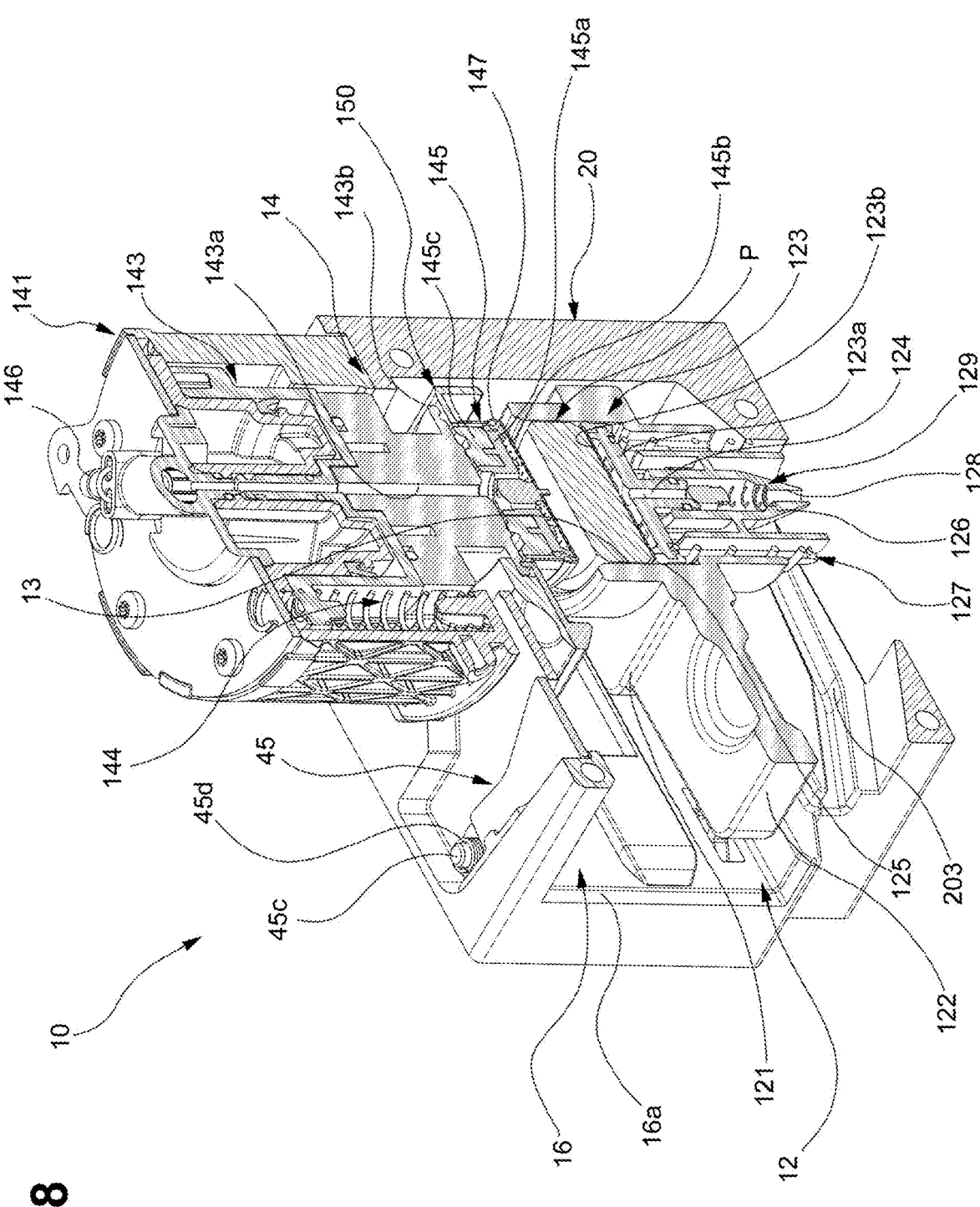
Figure 11:
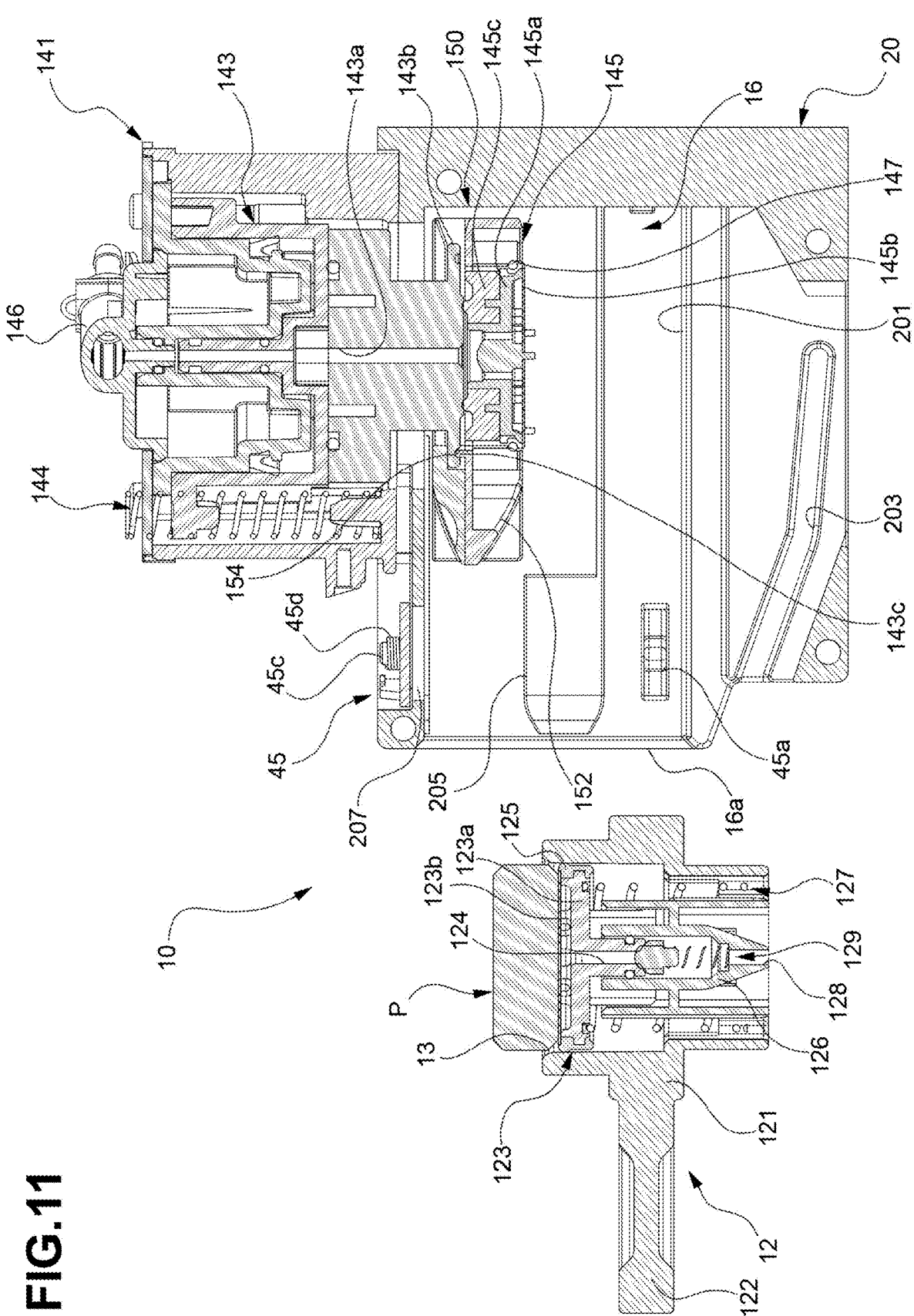

The first assembly part 12 is insertable into or extractable from a lower part of the cavity 16 and has a receptacle 13 adapted to receive a powdered product P, which in the illustrated example is represented as a compacted tablet. FIGS. 2, 6, and 11 show a condition wherein the first assembly part 12 is completely extracted from the cavity 16. In this condition the first assembly part 12 is released from the support structure 20 and may be used for inserting the powdered product P into the receptacle 13, or for cleaning operations. FIGS. 8-9 and 14-15 show a condition in which the first assembly part 12 is in an insertion end position. FIGS. 3, 7, and 12-13 represent intermediate positions of the first assembly part 12.

Figure 9:
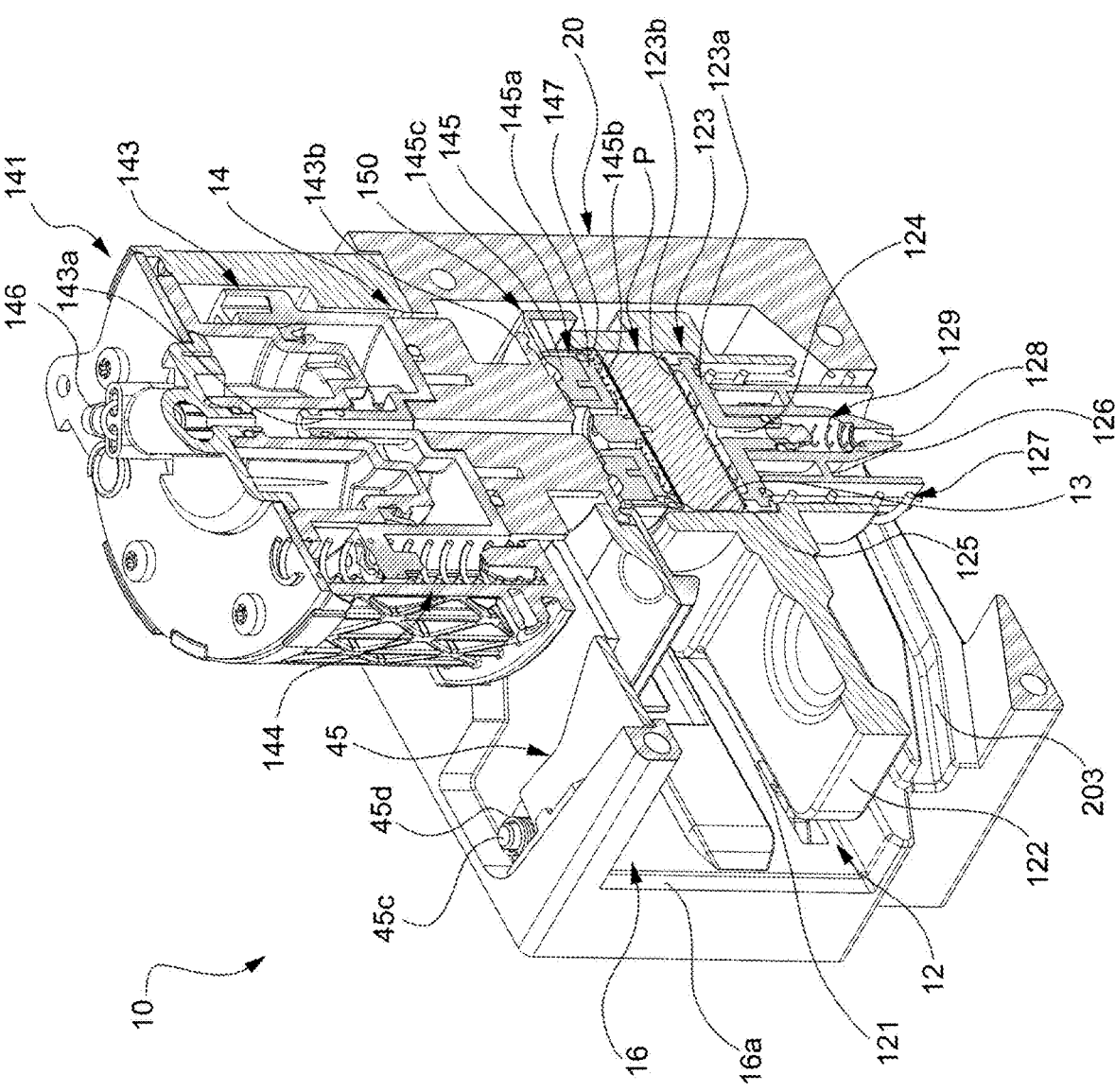
Figure 15:
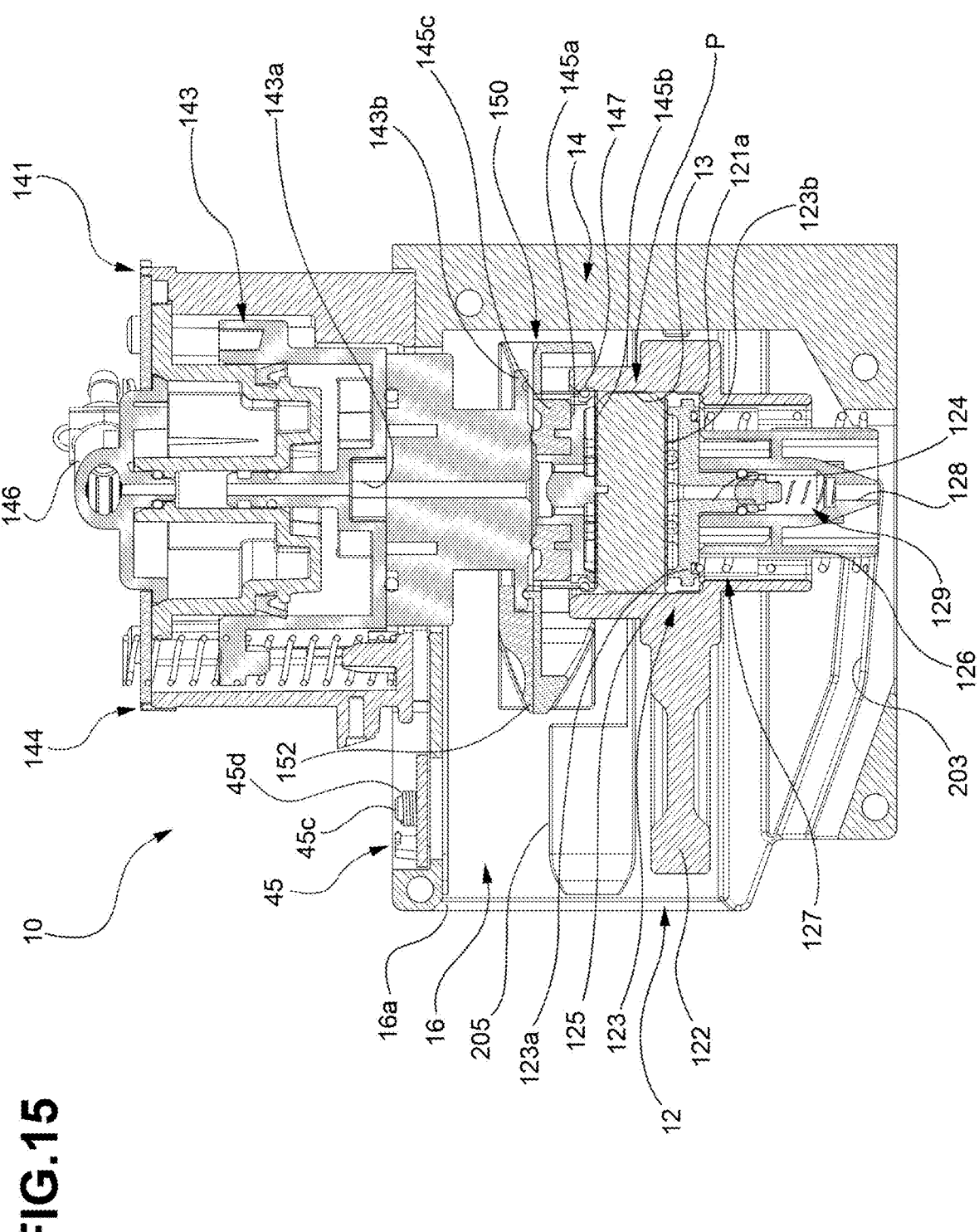

The second assembly part 14 is mounted to slide vertically within an upper part of the cavity 16, between a raised end position depicted in FIGS. 5-8 and 10-14 and a lowered end position depicted in FIGS. 9 and 15. In its raised end position, the second assembly part 14 allows insertion or extraction of the first assembly part 12 into or from the internal cavity 16. In the lowered end position, the second assembly part 14 and the first assembly part 12 are coupled to each other to jointly define a brewing chamber.

In addition to being adapted to receive the powdered product P, the receptacle 13 is adapted to form, together with the second assembly part 14, the brewing chamber.

As mentioned above, the first assembly part 12 is made as a drawer and comprises a main portion 121 made as a sleeve and a handle 122 connected to the main portion 121, which allows manipulation of the first assembly part 12. In the upper end of the main portion 121 is obtained the receptacle 13. Lateral sides of the main portion 121 of the first assembly part 12 are adapted to be coupled to respective main guides 201 formed on opposite lateral sides of the support structure 20, to allow the first assembly part 12 to slide relative to the support structure 20 and thus the insertion/extraction of the first assembly part 12.

Within the first assembly part 12, more specifically within the main portion 121 thereof, a filtering element 123 is mounted to translate vertically through which a central dispensing duct 124 is formed for dispensing the beverage. In particular, the filtering element 123 is slidable between a raised end position, depicted in FIGS. 6-7 and 11-12, and a lowered end position, depicted in FIGS. 9 and 15, in which the filtering element abuts against a shoulder 121a formed on the main portion 121 of the first assembly part 12.

The filtering element comprises a main body 123a and a filtering screen 123b attached to the main body 123a. The filtering screen 123b may be heat-locked, for example fixed to spindle pins 123c extending from the main body 123a. Advantageously, this arrangement provides planar surfaces which reduce possible dust accumulation. The filtering element 123, more specifically the filtering screen 123b, defines a bottom surface of the receptacle 13, and therefore also defines a bottom surface of the brewing chamber when the first assembly part 12 and the second assembly part 14 are coupled to each other. The filtering element 123 therefore provides a support surface for the powdered product P positioned in the receptacle 13.

Arranged around the filtering element 123 is a peripheral gasket 125 configured to exert a seal against a radially inner surface of the receptacle 13. Advantageously, where the powdered product P is bulk powder or a compacted tablet, the peripheral gasket 125 allows the radially inner surface of the receptacle 13 to be scraped clean of any residual powder when the filtering element 123 slides within the receptacle 13 from a lowered position to a raised end position.

As may be seen in particular in FIG. 12-15, the filtering element 123 is associated with a driving element 126, which is mounted to translate vertically within the first assembly part 12, more specifically within the main portion 121 of the first assembly part 12. In particular, the filtering element 123 is connected to the driving element 126 through elastic means 127, in particular a coil spring. There is a coupling between the filtering element 123 and the driving element 126 that allows a relative sliding between the filtering element 123 and the driving element 126, limited within a small stroke allowed by the deformation of the elastic means 127.

A central dispensing duct 128 is formed through the driving element 126, which is fluidically connected to the central dispensing duct 124 of the filtering element 123 through a pre-brewing valve 129 interposed between the filtering element 123 and the driving element 126. The pre-brewing valve 129 comprises a valve member cooperating with a seat formed on the dispensing duct 124 of the filtering element 123 with which elastic means, in particular a spring, are associated. The object of this valve will be described hereinafter.

On opposite sides of a lower end of the driving element 126 are arranged respective pins integral with the driving element 126, one of which is visible in FIG. 2 and denoted as 131. The pins 131 are adapted to engage respective secondary guides 203 formed on opposite lateral walls of the support structure.

As may be seen in FIG. 10-15, the secondary guides 203 are inclined downward, unlike the primary guides 201 that guide the sliding of the first assembly part 12 into the cavity 16 of the support structure 20, such guides being oriented horizontally. Such an arrangement ensures that during the sliding of the first assembly part 12 within the cavity 16, the driving element 126 is induced to translate vertically with respect to the first assembly part 12 by the coupling between the pins 131 and the secondary guides 203, driving with it the filtering element 123 and the powdered product P possibly positioned in the receptacle 13.

Associated with the second assembly part 14 is a hydraulic cylinder 141, in which a vertically sliding plunger 143 is mounted. The plunger 143 is part of the second assembly part 14. An inlet 141a is shown in FIG. 1-4, through which the hydraulic cylinder 141 may be supplied with a liquid, in particular water, through ducts not shown, to control the forward motion of the plunger 143 from its retracted position shown in FIGS. 5-8 and 10-14, at the raised end position of the second assembly part 14. The forward motion of the plunger 143 is counteracted by elastic means 144 which comprise in particular a coil spring and are interposed between the plunger 143 and the hydraulic cylinder 141. Such elastic means 144 are therefore arranged to bias the plunger 143 toward the retracted position thereof.

A central duct 143a is formed through the plunger 143, which is connected to a water supply duct 146 obtained through the hydraulic cylinder 141. A flange 143b is obtained on a lower end of the plunger 143.

A brewing head 145 integral with the plunger 143 is arranged on the lower end of the plunger 143 and is a part of the second assembly part 14. Ducts for injecting water into the brewing chamber are obtained through the brewing head 145, which are fluidically connected to the central duct 143a of the plunger 143.

As may be seen, for example, in FIGS. 9 and 15, the brewing head 145 comprises a main body 145a and an interface element 145b fastened to the main body 145a. The interface element 145b may be heat-locked, for example fixed to spindle pins extending from the main body 145a. Advantageously, this arrangement provides planar surfaces which reduce possible dust accumulation. The brewing head 145, or more specifically the interface element 145b, defines a top surface of the brewing chamber.

The interface element 145b is intended to come in contact with the powdered product P. In the illustrated example, the interface element 145b is constructed as a filter screen and will be denoted as an inlet filter hereinafter. In the event that the brewing unit is intended for operation with a capsule, the interface element could be constructed as an element provided with tips for piercing the capsule casing.

Arranged around the brewing head 145 is a peripheral gasket 147 configured to come in contact with a radially internal surface of the receptacle 13 in the lowered position of the second assembly part 14. Advantageously, where the powdered product P comprises bulk powder or a compacted tablet, the peripheral gasket 147 allows the radially internal surface of the receptacle 13 to be scraped clean of any residual powder when the brewing head 145 slides within the receptacle 13.

Figure 5:
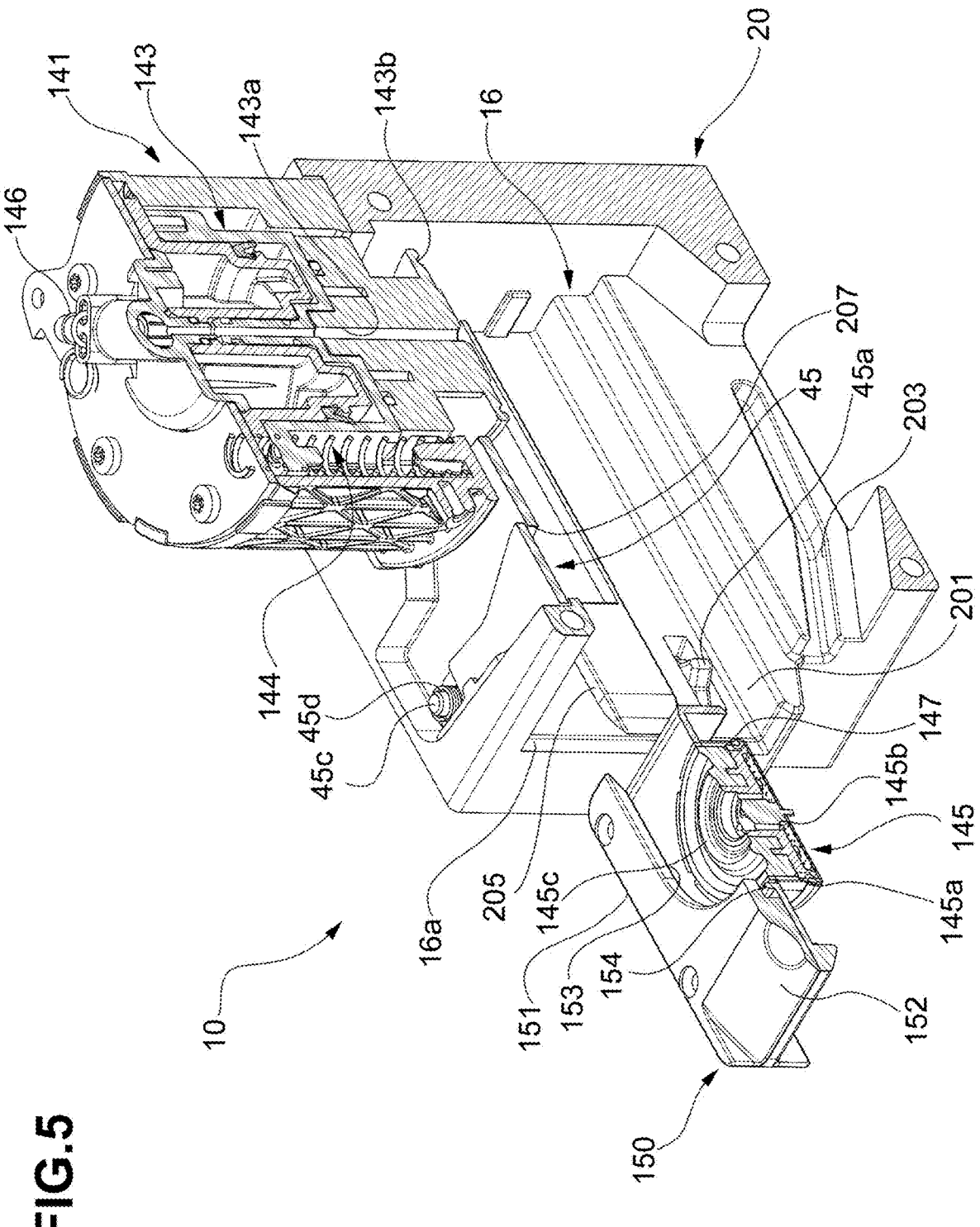
FIGS. 5 to 9 are sectioned perspective views of the brewing unit from FIG. 1-4, in different stages of operation.
Figure 10:
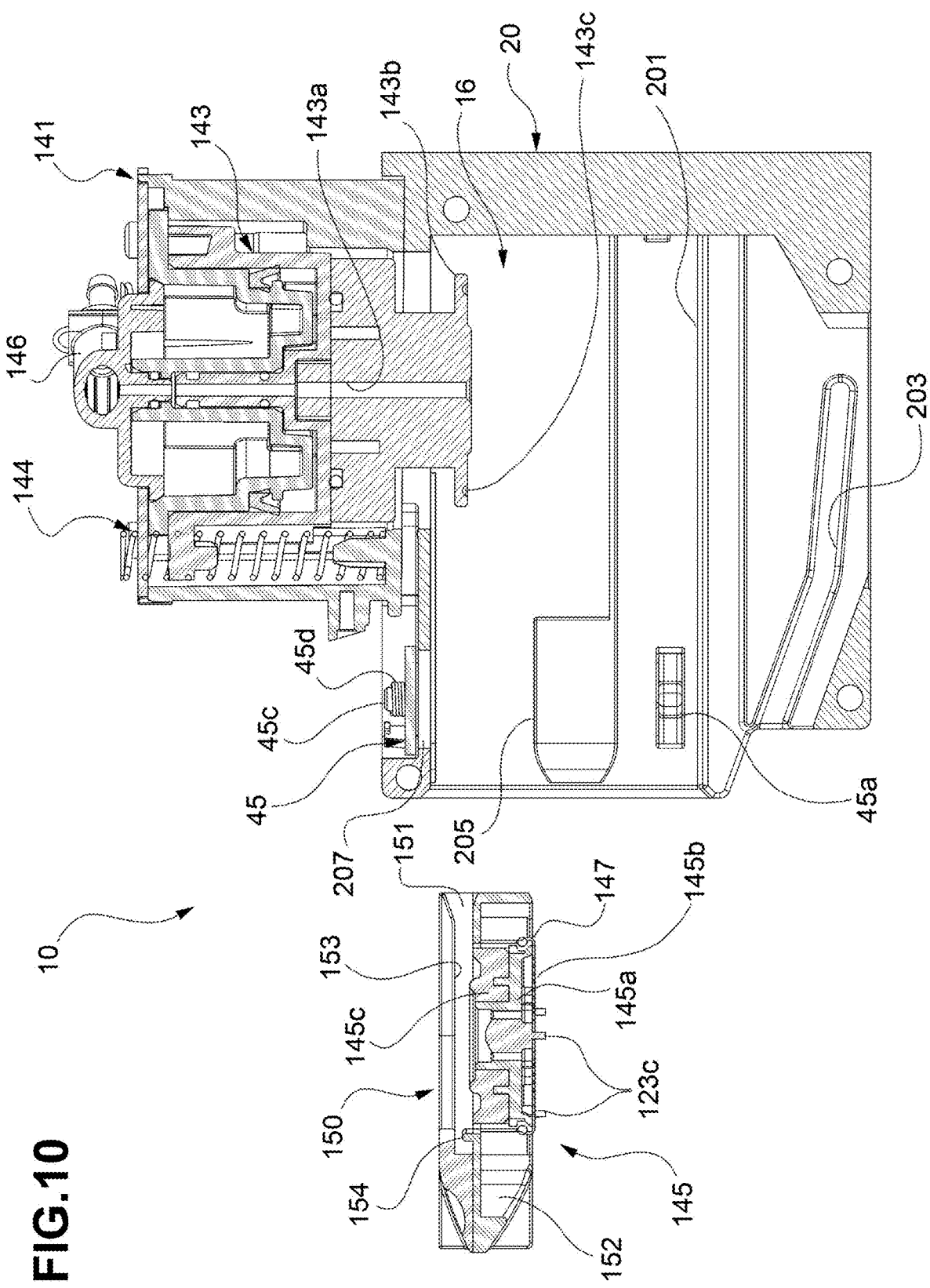
FIGS. 10 to 15 are cross-sectional views of the brewing unit from FIG. 1-4, in different stages of operation.

With reference to FIGS. 1, 5 and 10, the brewing head 145 is integral with an intermediate member 150 removably mounted on the lower end of the plunger 143. FIGS. 1, 5 and 10 show precisely the intermediate member 150 in a condition wherein the intermediate member 150 is detached from the lower end of the plunger 143. In this condition, the brewing head 145 may be cleaned. In the other figures, however, the intermediate member 150 is in a condition of being mounted on the lower end of the plunger 143.

The intermediate member 150 is constructed as a drawer and comprises a main frame portion 151 carrying the brewing head 145 and a handle 152 connected to the main frame portion 151, which allows for the intermediate member 150 to be manipulated.

Lateral sides of the main portion 151 of the intermediate member 150 are adapted to be coupled to respective auxiliary guides 205 formed on opposite lateral walls of the support structure 20 to allow the intermediate member 150 to slide relative to the support structure 20 and thus for the intermediate member 150 to be inserted/extracted. The intermediate member 150 is therefore selectively removable from or mountable on the lower end of the plunger 143 according to a sliding direction parallel to the sliding direction of the first assembly part 14.

A slit 153 surrounding an upper end of the brewing head 145 is obtained in the main portion 151 of the intermediate member 150. Said slit 153 is adapted to receive the flange 143b formed on the lower end of the plunger 143 when the intermediate member 150 is mounted on the lower end of the plunger 143. To provide a seal between the brewing head 145 and the plunger 143, an upper portion 145c of the main body 145b of the brewing head 145, intended to come in contact with the lower end of the plunger 143, is made of an elastomeric material, preferably molded. Advantageously, the part 145c made of elastomeric material materially connects the brewing head 145 to the main portion 151 of the intermediate member 150. A tooth 154 formed on the intermediate member 150 and arranged within the slit 153 between the brewing head 145 and the handle 152 of the intermediate member 150. The tooth 154 is configured to elastically engage a corresponding seat 143c formed on the lower end of the plunger 143. Such an arrangement allows for the intermediate member 150 to be snap-locked onto the lower end of the plunger 143.

According to an alternative embodiment, not shown, the brewing head 145 may be a component non-removably mounted on the plunger 143.

Figure 12:
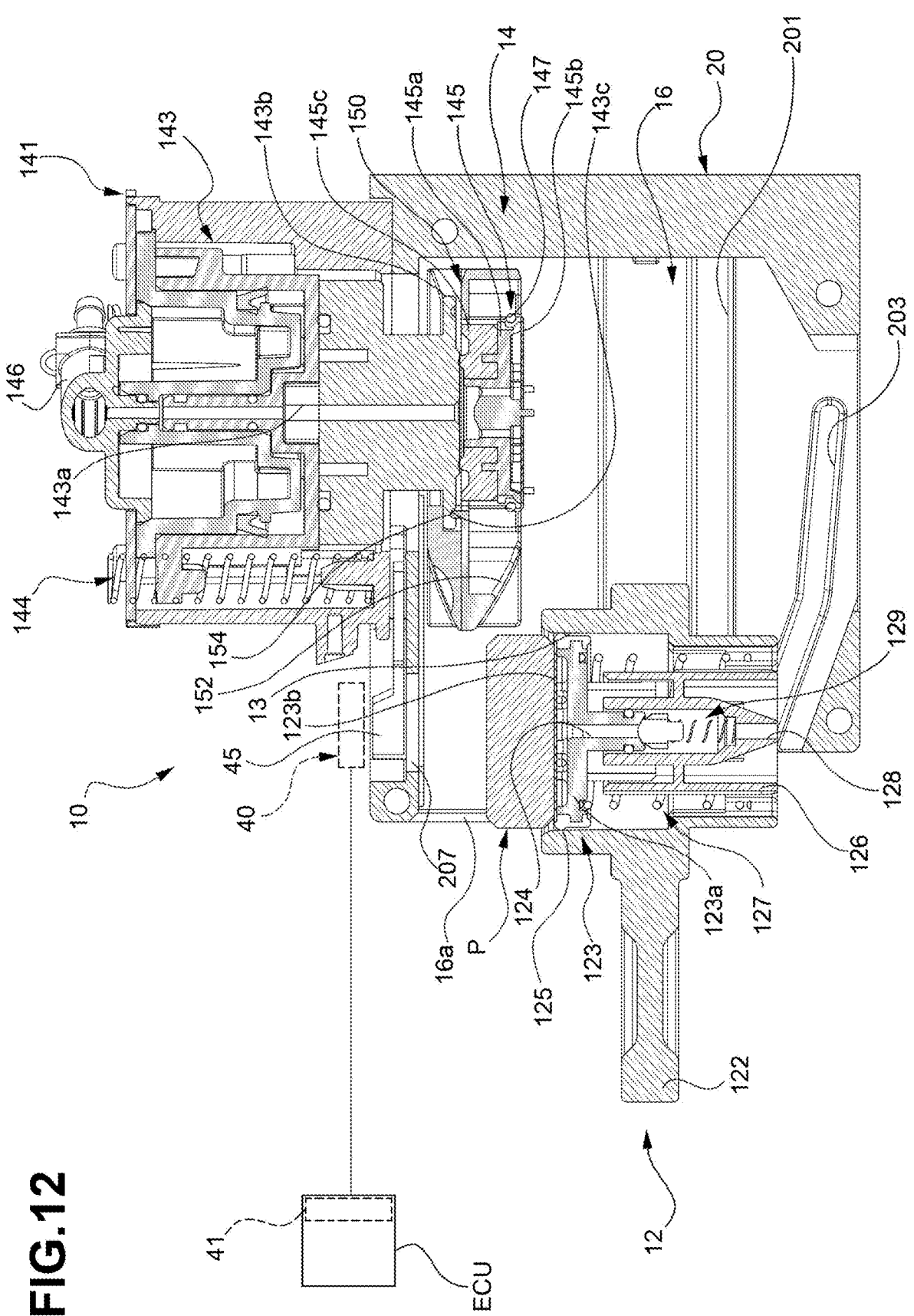
Figure 13:
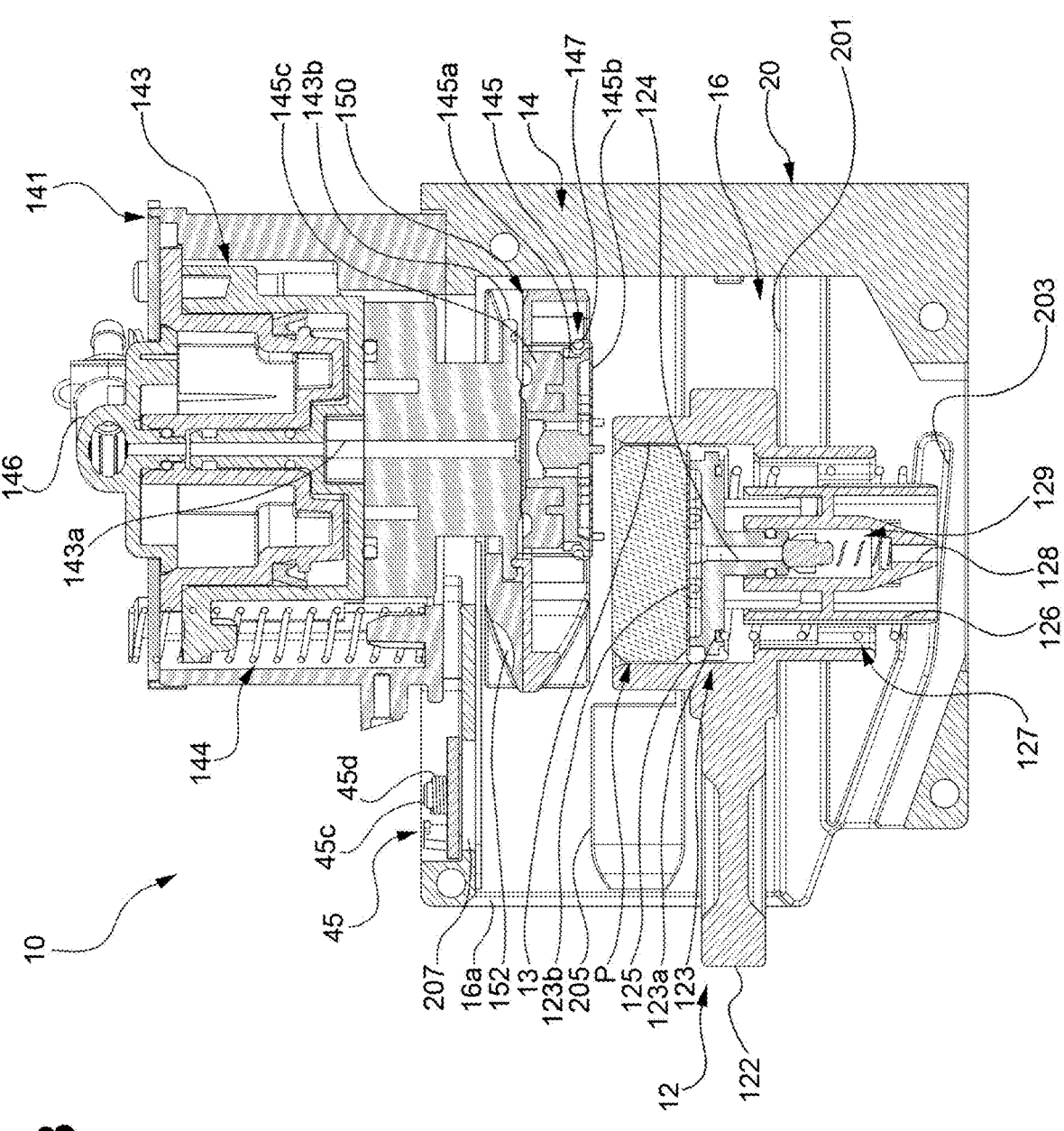
Figure 14:
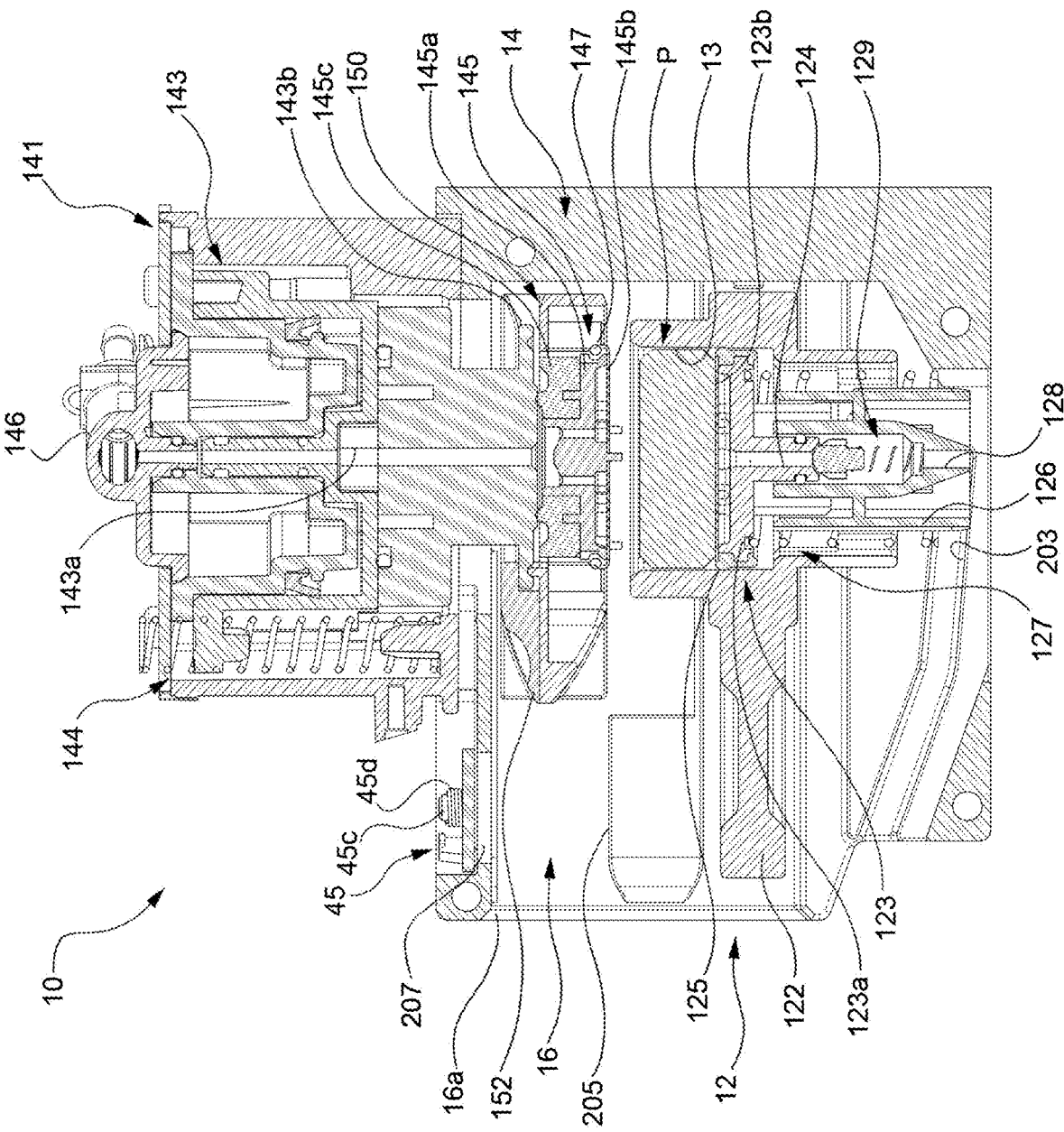

The brewing unit 10 may further comprise an optical sensor 40, shown schematically only in FIG. 12. This optical sensor 40 is arranged at a window 207 formed on an upper wall of the support structure 20. The optical sensor 40 is positioned whereby the receptacle 13 faces toward it when the first assembly part 12 passes the insertion opening 16a, entering the cavity 16. In the detection position, the interior of the receptacle 13, and thus the tablet P therein, falls within the field of view of the optical sensor 40. This optical sensor 40 is connected to a circuit 41, controlled by an electronic control unit ECU, and cooperates therewith to provide a digital image of the tablet P. The electronic control unit ECU is therefore programmed to perform a recognition of the product contained in the receptacle 13, for example by reading an identification code or drawing affixed to the product, or other surface features of the product. The readout may be taken dynamically, and thus with the first assembly part 12 being detected without stopping at the detection position. In an alternative embodiment, the readout may be taken statically, with the first assembly part 12 momentarily stopping in the detection position.

In case of successful recognition of the tablet, the ECU is programmed to allow the first assembly part 12 to proceed and adjust the brewing parameters based on the recognized tablet. These parameters may be, for example, the amount of water to be injected into the brewing chamber.

In order to protect the optical sensor 40 from possible soiling caused by the powdered product P, a movable closure element 45 is arranged at the window 207. This closure element 45 is normally in a closed position, in which it occludes the window 207. An opening mechanism, comprising a lever 45a (visible, for example, in FIGS. 5 and 6) which is rotatable about a vertical axis, is associated with this closure element 45. The lever 45a is rotationally integral with the closure element 45, via a shaft 45c. Upon entering the cavity 16, the first assembly part 12 engages the lever 45a causing it to rotate and open the window 207. During a stretch of sliding of the first assembly part 12 within the cavity 16, the first assembly part 12 remains engaged to the lever 45a, thus keeping the window 207 open. Once a given position within the cavity 16 is reached, the first assembly part 12 disengages the lever 45a. The closure element 45 may thus return to its closed position, which is biased by a coil spring 45d. The lever 45a is configured not to be engaged by the first assembly part 12 during extraction from the cavity 16, thereby preventing the opening of the window 207 and thus preventing vapors from entering the readout area.

An example of operation of the brewing unit 10 described above will now be described in detail.

According to this example, the working steps of the machine may be defined as follows:

1. the first assembly part 12 with the tablet P inside the receptacle 13 is inserted into the cavity 16;
2. readout and recognition position of the tablet P;
3. the first assembly part 12 reaches the insertion end position;
4. the second assembly part 14 lowers and the assembly closes;
5. pre-brewing, waiting, and brewing steps of the tablet P;
6. the second assembly part 14 rises and the assembly reopens;
7. the first assembly part 12 is extracted;
8. the intermediate member is disassembled for cleaning.

During the introduction into the cavity 16, the first assembly part 12 reaches the readout and recognition position of the tablet P (step 2). This step allows the system to recognize the presence of the tablet P inside the receptacle 13 before completing the closure of the dispensing assembly and to recognize the type of tablet that has been inserted and adapt the timing of compacting and dispensing.

During insertion of the first assembly part 12, the filtering element 123 is lowered preventing the tablet P from colliding with the intermediate member 150.

Upon reaching the insertion end position of the first assembly part 12, which may be detected by a sensor (not shown), the electronic control unit ECU controls the operation of the plunger 143 until the second assembly part 14 is coupled to the first assembly part 12. In this position, the brewing head 145 fits into the receptacle 13 until it comes in contact with the tablet P. The movement of the plunger 143 continues until it brings the filtering element 123 in contact with the shoulder 121*a* formed on the main portion 121 of the first assembly part 12 (compacting of the tablet P), where the peripheral gasket 125 of the filtering element 123 also exerts a frontal sealing function. Since the driving element 126 is vertically constrained by the secondary guides 203, the filtering element 123 moves relative to the driving element 126 against the action of the spring 127 interposed between the filtering element 123 and the driving element 126.

The displacement of the plunger 143 may be determined by the electronic control unit ECU as a function of the height of the tablet P, which may be determined using the optical sensor 40. More generally, it is possible to use doses of powdered product in different forms (compacted tablets, capsules, or simple bulk product) and different sizes for different preparations (espresso, lungo, double, filter). The recognition system provided by the sensor 40 and the control unit ECU may be configured to set different extraction parameters depending on the dose size and possibly skip one or more of the steps in the extraction, as will be clarified below.

Upon reaching the abutment position of the filtering element 123 against the shoulder 121*a*, pressure is maintained in the hydraulic cylinder 141.

The beverage is dispensed in two distinct sub-steps: pre-brewing and waiting and brewing of the tablet.

In the pre-brewing and waiting step, an initial, small amount of hot water is sent into the brewing chamber through the central duct 143*a* of the plunger 143, an amount that is unable to open the pre-brewing valve 129. Injecting this small amount of water and waiting afterward serves to wet and prepare the tablet P for the brewing step.

In the brewing step, a second amount of hot water is sent to the tablet P, which is able to open the pre-brewing valve 129. In this step the volume of hot water is much greater than in the previous step and is used to dispense the correct amount of beverage depending on the tablet that has been inserted into the receptacle 13. The pressure exerted by the plunger 143 of the hydraulic cylinder 141 is maintained throughout the pre-brewing and brewing steps.

A compaction step may also be provided wherein the introduction of hot water into the central dispensing duct is closed and cold water is sent into the hydraulic cylinder 141 in order to compact the used tablet and drain the hot water remaining therein.

Once the beverage dispensing is complete, the used tablet P must be removed to allow a new tablet to be inserted into the receptacle 13 for the next dispensing.

For this purpose, pressure is removed from the hydraulic cylinder 141, which causes the plunger 143, biased by the springs 144, to rise. With such rising, the filtering element 123, biased by the spring 127, returns to its raised position.

The first assembly part 12 may then be extracted by grasping it by the handle 122 to allow the removal of the used tablet P and cleaning/washing of the receptacle 13 and of the filtering element 123, possibly by removing the filtering element 123 with the driving element 126 from above.

Advantageously, due to the interaction between the pins 131 of the driving element 126 and the secondary guides 203, the translation of the first assembly part 12 brings the previously compacted product P upward and releases it from the radial friction of the brewing chamber, allowing it to be ejected by means of only the tilting of the first assembly part 12 (by gravity).

The intermediate member 150 may also be extracted by grasping it by the handle 152 to allow cleaning/washing of the filter head 145.

Depending on the type of powdered product used, one or more of the above steps may be absent. In particular, in the case of a filter preparation or soluble coffee, the compacting and pre-brewing steps are skipped. In other cases, post-compacting may not be required. In this regard, the control unit ECU may be configured to selectively enable or disable one or more of the steps described above based on recognition of the product type, carried out after processing of the digital image captured by the sensor 40.

In relation to the compacting step, it is observed that the pre-brewing valve member 129 is configured to abut elastically against the respective seat on the filtering element 123 only when the brewing head 145 presses the filtering element 123 containing the powdered product against the shoulder 121*a*. In the absence of such compression action, there is no engagement between the pre-brewing valve 129 and the respective seat on the filtering element 123. This makes it possible to dispense without operating the pre-brewing valve 129 (for example in the case of using a filter preparation) without performing the pre-brewing and compacting steps.

FIGS. 16 to 23 depict another embodiment of the invention. This embodiment is similar to the one described above, both in structure and operation. Elements corresponding to those of the foregoing embodiment have been assigned the same numerical references. These elements will not be further described.

Figure 16:
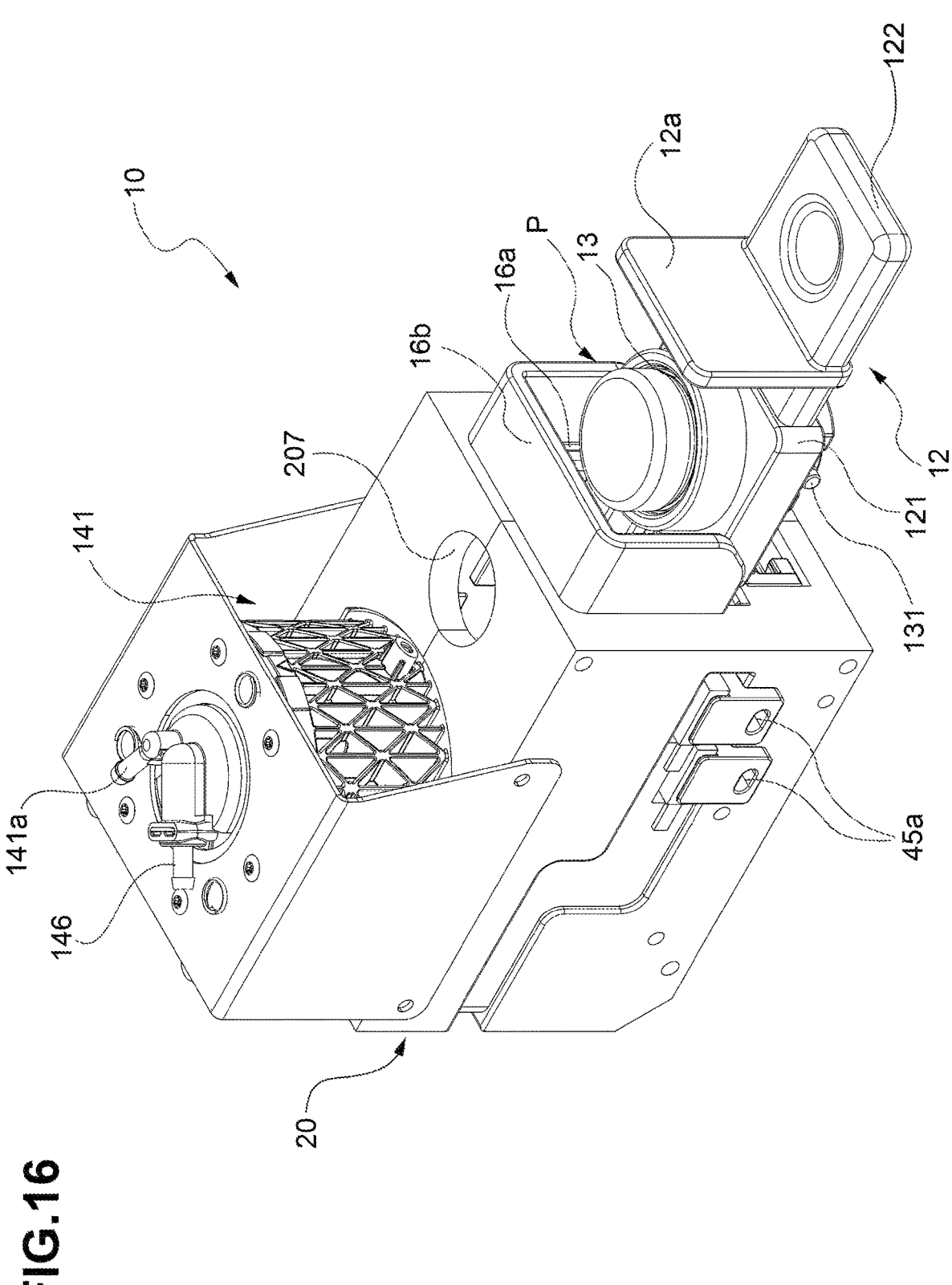
FIGS. 16 to 18 are perspective views of another embodiment of the brewing unit, in different stages of operation.
Figure 17:
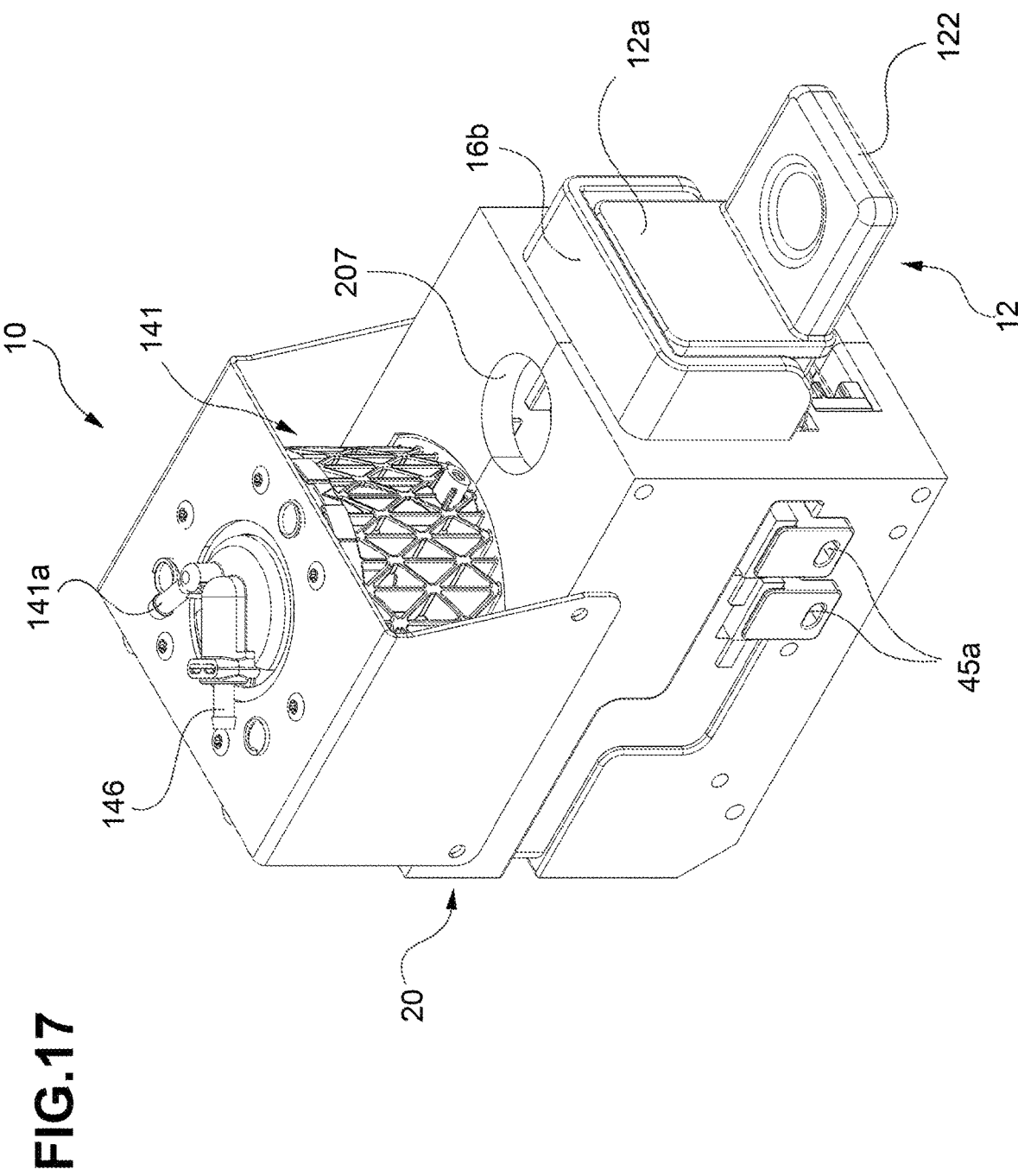
Figure 18:
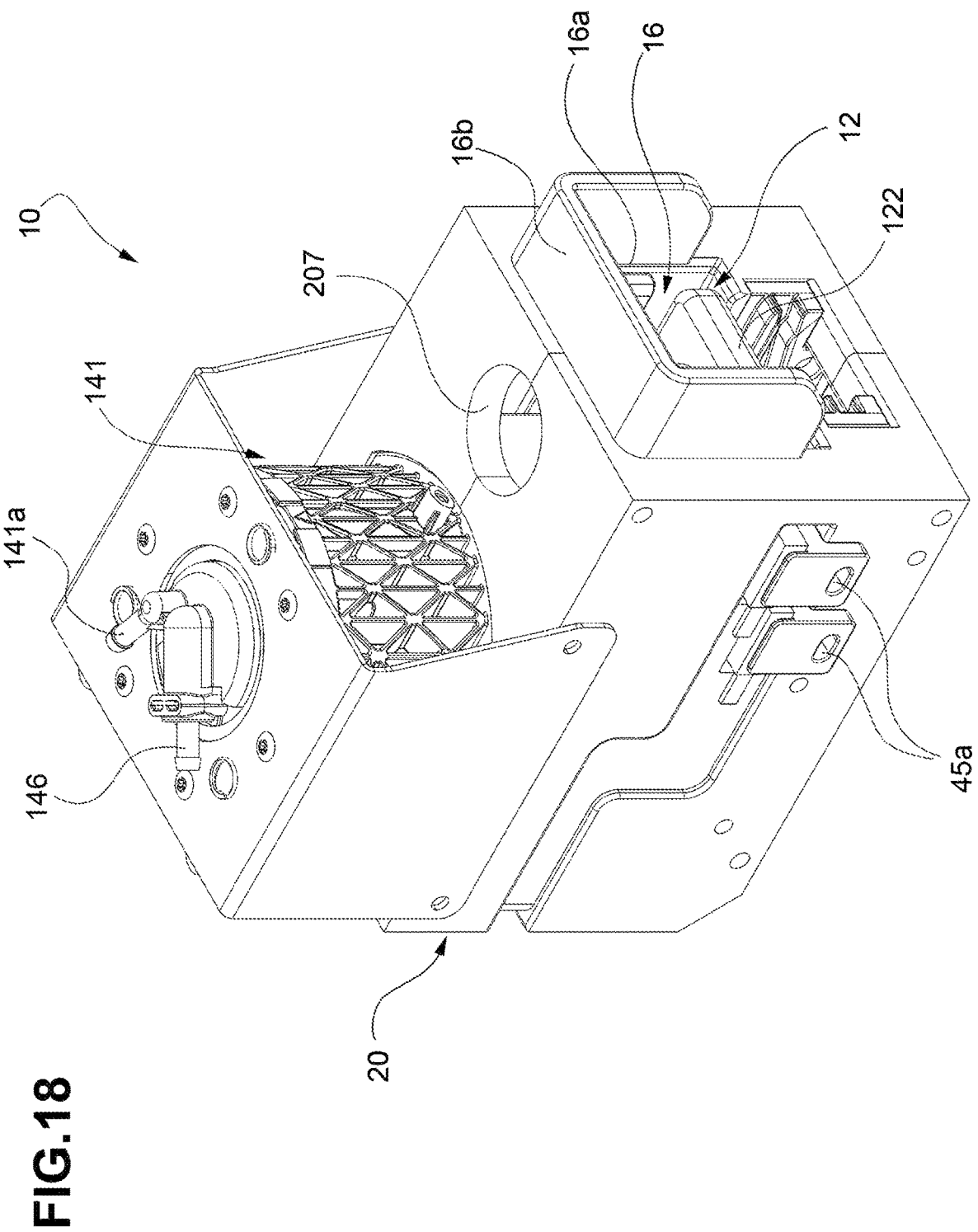
Figure 19:
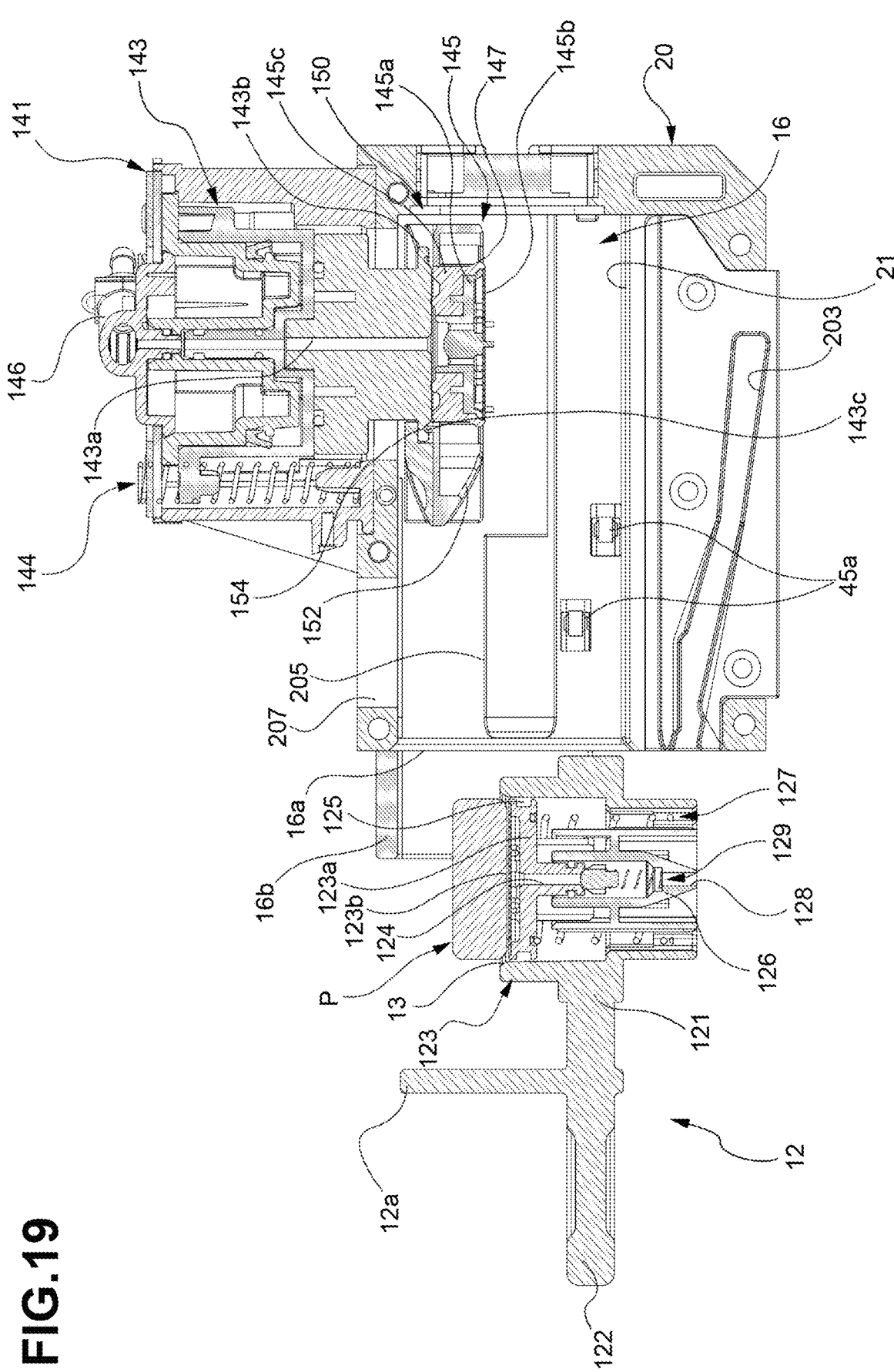
FIGS. 19 to 21 are cross-sectional views of the brewing unit from FIG. 16-18, in different stages of operation.
Figure 20:
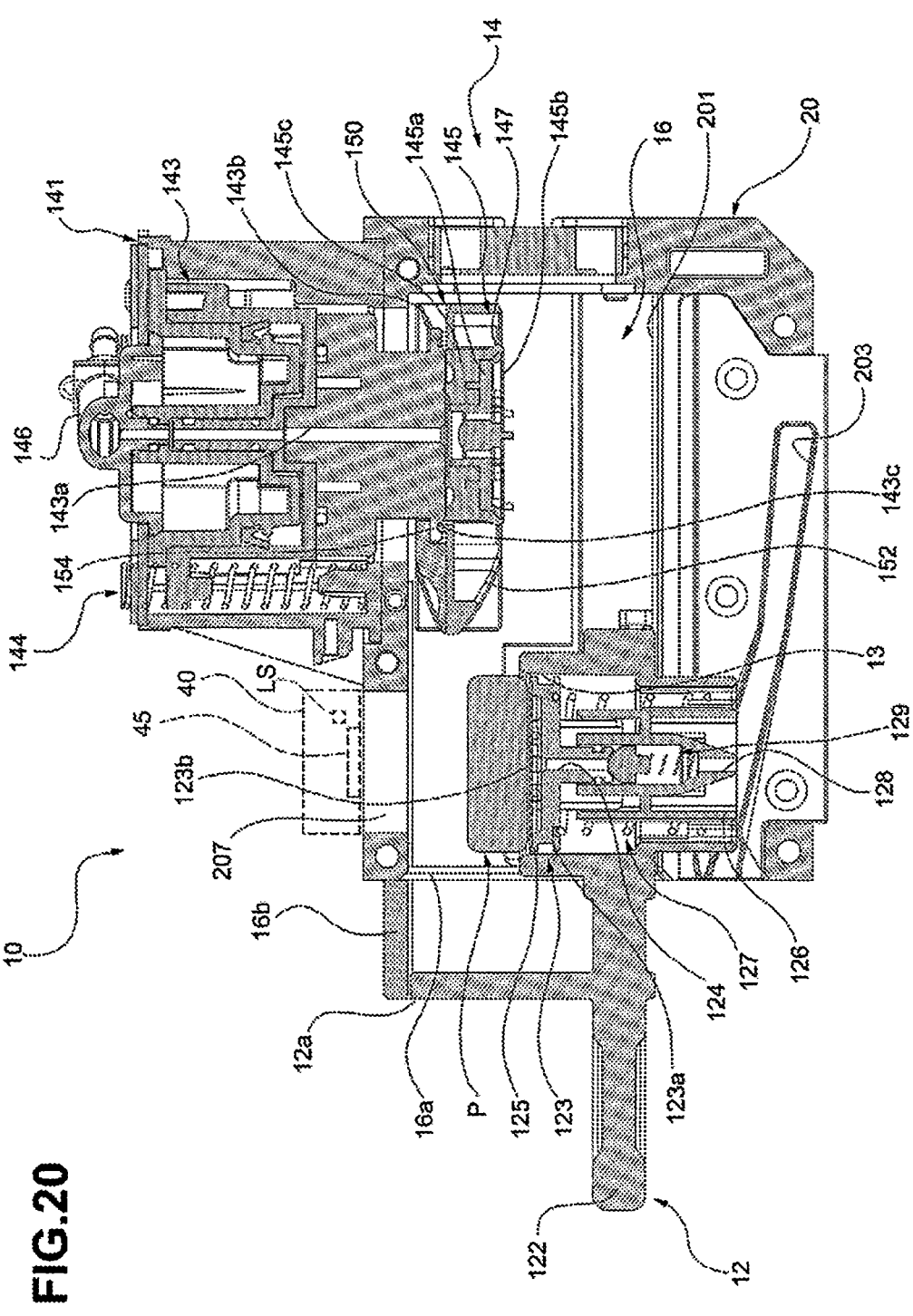
Figure 21:
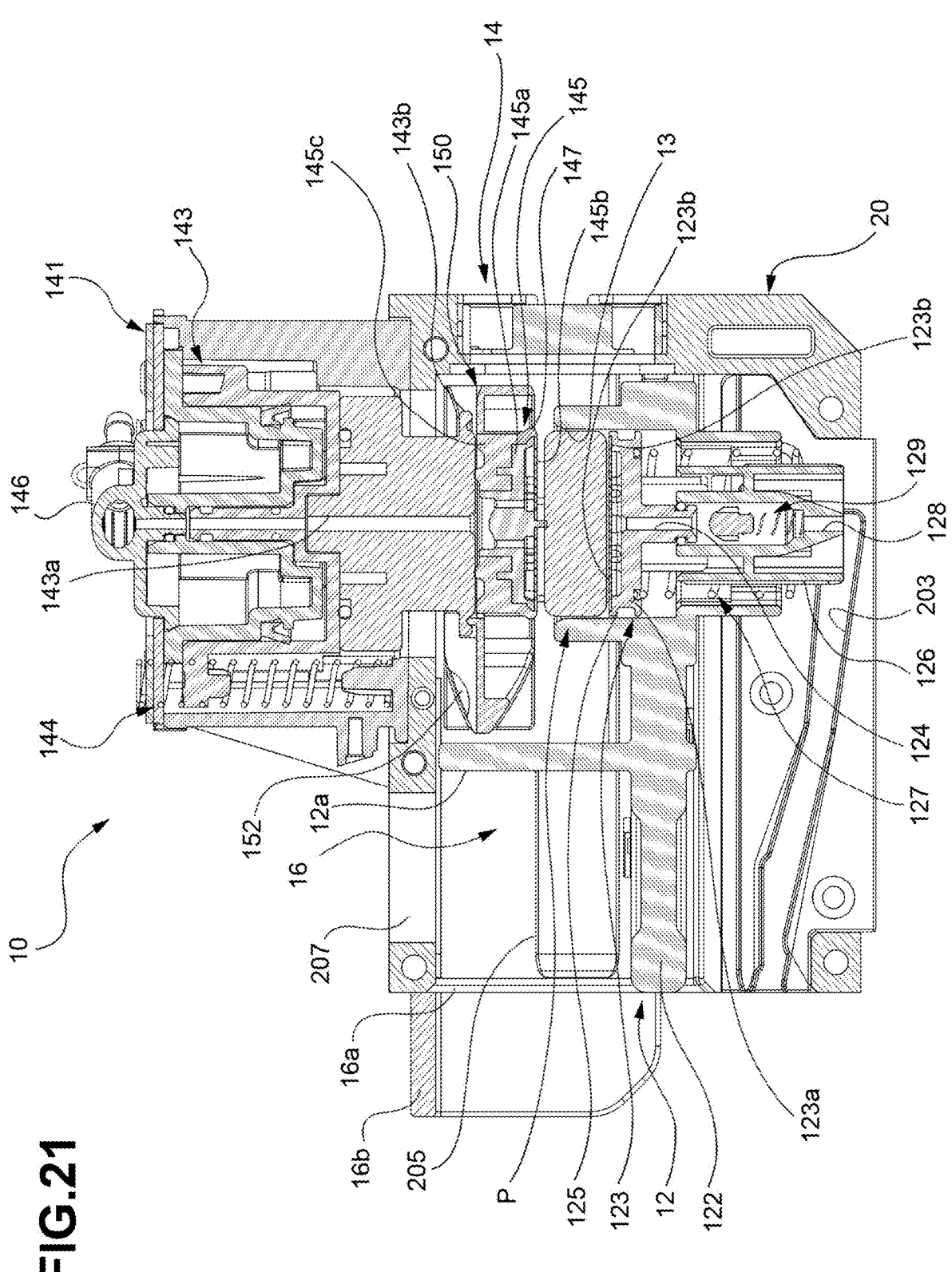
Figure 22:
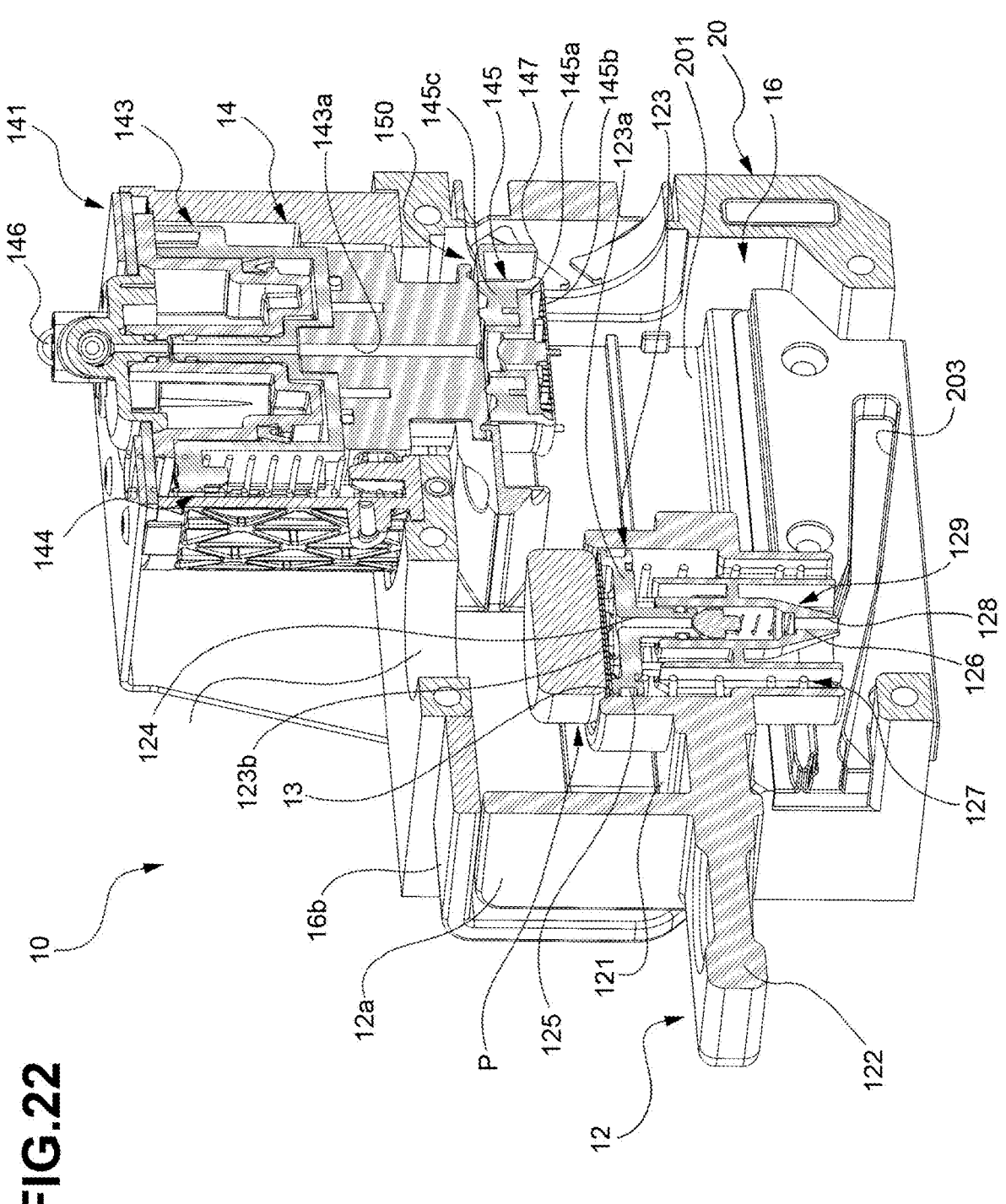
FIG. 22 is a sectioned perspective view of the brewing unit of FIG. 16-18.
Figure 23:
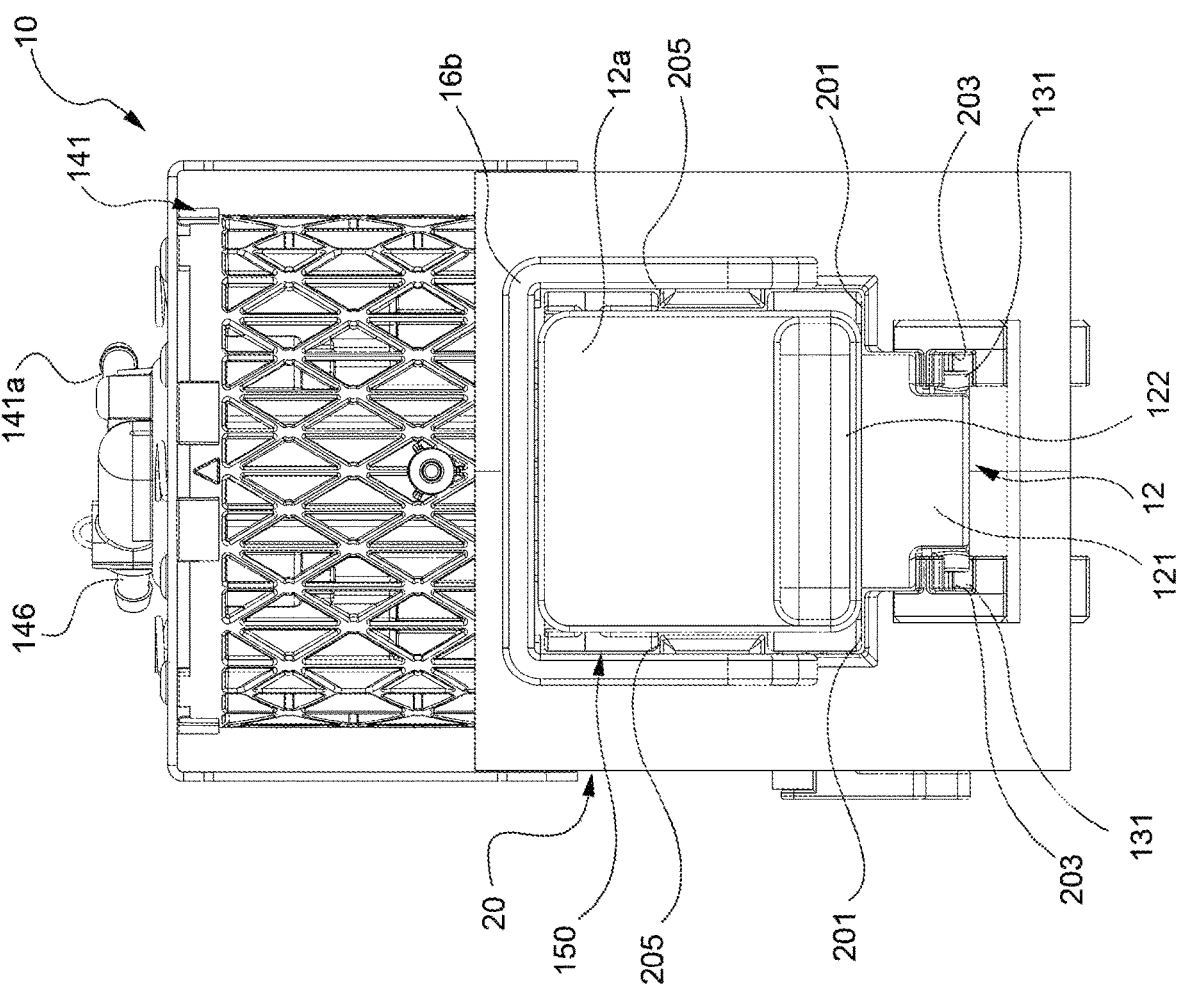
FIG. 23 is a front view of the brewing unit from FIG. 16-18.

FIGS. 16 and 19 show a condition in which the first assembly part 12 is fully extracted from the cavity 16. FIGS. 18 and 21 show a condition in which the first assembly part 12 is in an insertion end position. FIGS. 17, 20, 22, and 23 show the first assembly part 12 in an intermediate position, more precisely in the detection position. For convenience, the optical sensor is shown schematically only in FIG. 20, while the related movable closure element is not shown in FIG. 16-23. However, this movable closure element is positioned at the window 207, in a manner similar to the closure element 45 of the preceding embodiment. Also shown in FIG. 16-23 is a part of the driving mechanism for the movable closure element, represented by sliders shown again with the reference 45*a*.

In the embodiment of FIG. 16-23, the first assembly part 12 comprises a partition 12*a* formed between the main portion 121 and the handle 122 of the first assembly part 12 and extending upward from the first assembly part 12. A screen 16*b* is arranged at the insertion opening 16*a* of the support structure 20, this screen being formed so as to partially surround the insertion opening 16*a*, in particular an upper portion of the insertion opening 16*a*. Depending on the shape of the support structure 20, the screen 16*b* may not be required.

As may be seen in FIGS. 17, 20, 22 and 23, when the first assembly part 12 is in the detection position the partition 12*a* occludes the insertion opening 16*a*, in the example illustrated with the cooperation of the screen 16*b*, so as to prevent light from entering through this opening.

Such a closure interrupts the input of light that varies with ambient conditions during acquisition, resulting in controlled and repeatable lighting conditions, which may be provided by a lighting system (not shown) associated with the optical sensor 40 and controllable to light the interior to the cavity 16.

Naturally, without prejudice to the principle of the invention, the embodiments and the details of construction may vary widely with respect to that which has been described and illustrated purely by way of non-limiting example, without thereby departing from the scope of the invention as defined by the appended claims.

The invention claimed is:

1. A brewing unit for preparing a beverage from a powdered product containing at least one ingredient, the brewing unit comprising a support structure comprising an inner cavity, and a dispensing assembly that includes a first assembly part configured as a drawer insertable into or extractable from a lower part of said inner cavity and comprising a receptacle adapted to receive said powdered product, and a second assembly part mounted to slide vertically within an upper part of said inner cavity, between a raised position, in which the second assembly part allows insertion or extraction of the first assembly part, and a lowered position, in which the second assembly part and the first assembly part are coupled to each other to define a brewing chamber therebetween, wherein within said first assembly part there is mounted to translate vertically a filtering element through which there is formed a dispensing duct, said filtering element defining a bottom surface of the receptacle and of the brewing chamber, and wherein a brewing head adapted to inject water into the brewing chamber is carried by a lower end of the second assembly part, said brewing head defining a top surface of the brewing chamber and being provided with a radial sealing gasket configured to come in contact with a radially inner surface of the receptacle in the lowered position of the second assembly part, wherein said filtering element is elastically biased toward an end position thereof which is raised relative to the first assembly part, and wherein said filtering element is elastically connected to a driving element vertically translationally movable within said first assembly part, and wherein said driving element is guided by said support structure to move vertically translationally relative to the first assembly part during a sliding motion of the first assembly part into the inner cavity.

2. The brewing unit of claim 1, wherein through the driving element there is formed a central dispensing duct fluidically connected to the dispensing duct of the filtering element through a pre-brewing valve interposed between the filtering element and the driving element, and wherein the pre-brewing valve is configured to elastically abut against the filtering element when the brewing head presses the filtering element containing the powdered product against a shoulder formed on the first assembly part.

3. The brewing unit of claim 1, wherein the second assembly part further comprises a plunger hydraulically operated and slidable within the upper part of said inner cavity, said plunger carrying the brewing head.

4. The brewing unit of claim 3, further comprising at least one springs interposed between the plunger and a hydraulic cylinder fixed to the support structure, said at least one springs being adapted to bias the plunger toward a retracted position corresponding to the raised position of the second assembly part.

5. The brewing unit of claim 1, wherein said brewing head is fixed to an intermediate member removably mounted to the lower end of the second assembly part.

6. The brewing unit of claim 5, wherein said intermediate member is selectively removable or mountable to the lower end of the second assembly part according to a sliding direction parallel to a sliding direction of the first assembly part into the inner cavity.

7. The brewing unit of claim 6, further comprising a readout device adapted to provide a digital image of said powdered product, said readout device comprising an optical sensor, wherein the receptacle faces the optical sensor in a detection position in which the first assembly part surpasses an insertion opening of the inner cavity.

8. The brewing unit of claim 7, wherein said optical sensor is capable of detecting said powdered product in a static or dynamic manner.

9. The brewing unit of claim 7, further comprising an electronic control unit (ECU) configured to adjust brewing parameters based on said digital image of the powdered product.

10. The brewing unit of claim 9, wherein said electronic control unit (ECU) is configured to determine a dose size of the powdered product from said digital image and to adjust said brewing parameters as a function of said dose size.

11. The brewing unit of claim 7, wherein the first assembly part comprises a partition extending transversely relative to the sliding direction of the first assembly part into the inner cavity, wherein in the detection position said partition occludes the insertion opening to prevent light from entering through the insertion opening, and wherein the readout device is configured to emit light inside of the inner cavity.

* * * * *